(12) United States Patent
Sun et al.

(10) Patent No.: US 10,720,980 B2
(45) Date of Patent: Jul. 21, 2020

(54) RANDOM ACCESS CHANNEL WINDOW DESIGN IN MILLIMETER WAVE SHARED SPECTRUM

(71) Applicant: QUALCOMM Incorporated, San Diego, CA (US)

(72) Inventors: Jing Sun, San Diego, CA (US); Xiaoxia Zhang, San Diego, CA (US); Andrei Dragos Radulescu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 82 days.

(21) Appl. No.: 16/027,735

(22) Filed: Jul. 5, 2018

(65) Prior Publication Data

US 2019/0029040 A1    Jan. 24, 2019

Related U.S. Application Data

(60) Provisional application No. 62/534,540, filed on Jul. 19, 2017.

(51) Int. Cl.
*H04B 7/06* (2006.01)
*H04B 7/0413* (2017.01)
(Continued)

(52) U.S. Cl.
CPC ........ *H04B 7/0695* (2013.01); *H04B 7/0413* (2013.01); *H04B 7/06* (2013.01);
(Continued)

(58) Field of Classification Search
CPC ... H04L 5/0048; H04L 5/005; H04L 27/0006; H04W 16/14; H04W 56/0005;
(Continued)

(56) References Cited

U.S. PATENT DOCUMENTS 8,717,985 B2   5/2014  Du et al.
9,414,412 B2   8/2016  Park et al.
(Continued)

FOREIGN PATENT DOCUMENTS

WO   WO-2016086144 A1   6/2016

OTHER PUBLICATIONS

Huawei, R1-1608846, Synchronization Signal Design in NR, 3GPP TSG RAN WG1 Meeting #86bis, 5 pages, Oct. 2016.*
(Continued)

*Primary Examiner* — Afsar M Qureshi
(74) *Attorney, Agent, or Firm* — Holland & Hart LLP

(57) ABSTRACT

Techniques are described herein for coordinating a random access channel (RACH) procedure with a beam discovery procedure. A timing and configuration of a RACH window may be coordinated with a beam discovery window. By coordinating the two windows, a user equipment (UE) may be configured to use information learned from the beam discovery procedure during the RACH procedure, thereby increasing the likelihood that the RACH procedure is successful. In some cases, the RACH procedure is triggered by the transmission of directional beam reference signals during the beam discovery window. In such cases, the UE determines the timing of the RACH window based at least in part on the receipt of the directional beam reference signals. In some cases, the RACH window is configured using a static configuration relative to the beam discovery window.

30 Claims, 27 Drawing Sheets

(51) Int. Cl.
*H04W 48/16* (2009.01)
*H04W 74/00* (2009.01)
*H04W 16/28* (2009.01)
*H04W 74/08* (2009.01)

(52) U.S. Cl.
CPC .......... *H04B 7/0617* (2013.01); *H04W 48/16* (2013.01); *H04W 74/006* (2013.01); *H04W 16/28* (2013.01); *H04W 74/0808* (2013.01)

(58) Field of Classification Search
CPC .......... H04W 74/0833; H04W 74/006; H04W 74/0808; H04W 48/16; H04W 72/0446; H04W 72/048; H04W 72/0406; H04W 16/28; H04W 48/12; H04W 74/085; H04B 7/0695; H04B 7/0413; H04B 7/06; H04B 7/0617; H04B 7/065
See application file for complete search history.

(56) References Cited

U.S. PATENT DOCUMENTS

| | | | | |
|---|---|---|---|---|
| 2014/0341018 | A1* | 11/2014 | Bhushan | H04L 5/0053 370/230 |
| 2015/0382334 | A1* | 12/2015 | El Ayach | H04B 7/0695 370/336 |
| 2016/0234706 | A1* | 8/2016 | Liu | H04L 5/0048 |
| 2017/0034812 | A1* | 2/2017 | Deng | H04W 72/046 |
| 2017/0099126 | A1* | 4/2017 | Yoo | H04L 5/0048 |
| 2017/0127367 | A1 | 5/2017 | Axnas et al. | |
| 2017/0251499 | A1 | 8/2017 | Radulescu et al. | |
| 2017/0331670 | A1* | 11/2017 | Parkvall | H04W 52/0245 |
| 2018/0084473 | A1 | 3/2018 | Nagaraja et al. | |
| 2018/0241494 | A1* | 8/2018 | Chendamarai Kannan | H04J 11/0073 |
| 2018/0241526 | A1* | 8/2018 | Chendamarai Kannan | H04L 27/0006 |
| 2018/0242184 | A1* | 8/2018 | Yerramalli | H04W 16/14 |
| 2018/0242223 | A1* | 8/2018 | Chendamarai Kannan | H04W 48/12 |
| 2018/0242232 | A1* | 8/2018 | Chendamarai Kannan | H04W 48/16 |
| 2018/0255607 | A1* | 9/2018 | Nagaraja | H04W 76/28 |
| 2019/0059106 | A1* | 2/2019 | Zhang | H04W 16/14 |
| 2019/0104549 | A1* | 4/2019 | Deng | H04B 7/0617 |

OTHER PUBLICATIONS

E et al, Research on Compact Discovery Reference Signal for Future Synchronized Network, IEEE, 4 pages, 2014.*
International Search Report and Written Opinion—PCT/US2018/041051—ISA/EPO—dated Oct. 15, 2018.

* cited by examiner

RANDOM ACCESS CHANNEL WINDOW DESIGN IN MILLIMETER WAVE SHARED SPECTRUM

CROSS REFERENCES

The present application for patent claims the benefit of U.S. Provisional Patent Application No. 62/534,540 by SUN, et al., entitled "Random Access Channel Window Design in Millimeter Wave Shared Spectrum," filed Jul. 19, 2017, assigned to the assignee hereof, and expressly incorporated by reference in its entirety herein.

INTRODUCTION

The following relates generally to wireless communication, and more specifically to random access channel (RACH) window design in millimeter wave (mmW) shared spectrum.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may operate using a shared radio frequency spectrum band. Such shared radio frequency spectrum bands may implement contention-based protocols to manage network traffic. For example, contention-based protocols may be used to determine access to resources via RACH. Additionally, a RACH procedure may fail due to misalignment of directional beams between a base station and UE in a mmW wireless communication system, including in mmW shared spectrum.

SUMMARY

A method of wireless communication at a UE is described. The method may include receiving a directional beam discovery signal transmitted during a beam discovery window using a shared frequency spectrum band, initiating a RACH procedure during a RACH window, wherein a timing of the RACH window is based at least in part on receiving the directional beam discovery signal, and transmitting a directional RACH signal during the RACH window.

An apparatus for wireless communication at a UE is described. The apparatus may include means for receiving a directional beam discovery signal transmitted during a beam discovery window using a shared frequency spectrum band, means for initiating a RACH procedure during a RACH window, wherein a timing of the RACH window is based at least in part on receiving the directional beam discovery signal, and means for transmitting a directional RACH signal during the RACH window.

Another apparatus for wireless communication at a UE is described. The apparatus may include a processor, memory in electronic communication with the processor, and instructions stored in the memory. The instructions may be operable to cause the processor to receive a directional beam discovery signal transmitted during a beam discovery window using a shared frequency spectrum band, initiate a RACH procedure during a RACH window, wherein a timing of the RACH window is based at least in part on receiving the directional beam discovery signal, and transmit a directional RACH signal during the RACH window.

A non-transitory computer readable medium for wireless communication at a UE is described. The non-transitory computer-readable medium may include instructions operable to cause a processor to receive a directional beam discovery signal transmitted during a beam discovery window using a shared frequency spectrum band, initiate a RACH procedure during a RACH window, wherein a timing of the RACH window is based at least in part on receiving the directional beam discovery signal, and transmit a directional RACH signal during the RACH window.

Some examples of the method, apparatus, and non-transitory computer-readable medium described above may further include processes, features, means, or instructions for determining when the RACH window begins based at least in part on receiving a burst of directional beam discovery signals, wherein the directional beam discovery signal may be one of the burst of directional beam discovery signals.

Some examples of the method, apparatus, and non-transitory computer-readable medium described above may further include processes, features, means, or instructions for identifying a first communication resource used for the RACH window. Some examples of the method, apparatus, and non-transitory computer-readable medium described above may further include processes, features, means, or instructions for receiving the burst of directional beam discovery signals until a beginning of the first communication resource used for the RACH window.

Some examples of the method, apparatus, and non-transitory computer-readable medium described above may further include processes, features, means, or instructions for identifying a first communication resource used for the RACH window. Some examples of the method, apparatus, and non-transitory computer-readable medium described above may further include processes, features, means, or instructions for receiving the burst of directional beam discovery signals until a second communication resource occurring before the first communication resource.

Some examples of the method, apparatus, and non-transitory computer-readable medium described above may further include processes, features, means, or instructions for identifying a RACH window starting location that may be selected to allow the burst of directional beam discovery signals to include a transmitted beam in each beam direction associated with a base station.

Some examples of the method, apparatus, and non-transitory computer-readable medium described above may further include processes, features, means, or instructions for determining that the RACH window begins after the beam discovery window.

Some examples of the method, apparatus, and non-transitory computer-readable medium described above may further include processes, features, means, or instructions for identifying a last communication resource of the beam discovery window, wherein the RACH window begins at a first available communication resource after the last communication resource.

Some examples of the method, apparatus, and non-transitory computer-readable medium described above may further include processes, features, means, or instructions for identifying a last communication resource used for the beam discovery window. Some examples of the method, apparatus, and non-transitory computer-readable medium described above may further include processes, features, means, or instructions for receiving a burst of directional beam discovery signals until an end of the last communication resource used for the beam discovery window.

Some examples of the method, apparatus, and non-transitory computer-readable medium described above may further include processes, features, means, or instructions for identifying a starting time of the RACH window based at least in part on receiving the directional beam discovery signal.

Some examples of the method, apparatus, and non-transitory computer-readable medium described above may further include processes, features, means, or instructions for receiving an offset indicative of a duration between a last communication resource used for the beam discovery window and the starting time of the RACH window.

Some examples of the method, apparatus, and non-transitory computer-readable medium described above may further include processes, features, means, or instructions for receiving the starting time of the RACH window using a physical broadcast channel (PBCH) of the directional beam discovery signal.

Some examples of the method, apparatus, and non-transitory computer-readable medium described above may further include processes, features, means, or instructions for receiving the starting time of the RACH window using a separate channel from a PBCH of the directional beam discovery signal, the separate channel being transmitted together with the directional beam discovery signal using a same directional beam.

Some examples of the method, apparatus, and non-transitory computer-readable medium described above may further include processes, features, means, or instructions for identifying a synchronization signal block index of the directional beam discovery signal. Some examples of the method, apparatus, and non-transitory computer-readable medium described above may further include processes, features, means, or instructions for determining a timing of a base station based at least in part on the synchronization signal block index.

In some examples of the method, apparatus, and non-transitory computer-readable medium described above, the RACH window includes a plurality of RACH opportunities, each RACH opportunity associated with a directional beam of the shared frequency spectrum band.

In some examples of the method, apparatus, and non-transitory computer-readable medium described above, the beam discovery window may be a discovery reference signal (DRS) measurement timing configuration (DMTC).

A method of wireless communication at a base station is described. The method may include determining that communication resources on a shared frequency spectrum band are available for use during a beam discovery window based at least in part on a listen-before-talk (LBT) procedure, transmitting a burst of directional beam discovery signals during the beam discovery window based at least in part on the LBT procedure indicating available communication resources, identifying a timing of a RACH window that begins after the burst of directional beam discovery signals are transmitted based at least in part on the LBT procedure indicating the available communication resources, and receiving a directional RACH signal during the RACH window.

An apparatus for wireless communication at a base station is described. The apparatus may include means for determining that communication resources on a shared frequency spectrum band are available for use during a beam discovery window based at least in part on an LBT procedure, means for transmitting a burst of directional beam discovery signals during the beam discovery window based at least in part on the LBT procedure indicating available communication resources, means for identifying a timing of a RACH window that begins after the burst of directional beam discovery signals are transmitted based at least in part on the LBT procedure indicating the available communication resources, and means for receiving a directional RACH signal during the RACH window.

Another apparatus for wireless communication at a base station is described. The apparatus may include a processor, memory in electronic communication with the processor, and instructions stored in the memory. The instructions may be operable to cause the processor to determine that communication resources on a shared frequency spectrum band are available for use during a beam discovery window based at least in part on an LBT procedure, transmit a burst of directional beam discovery signals during the beam discovery window based at least in part on the LBT procedure indicating available communication resources, identify a timing of a RACH window that begins after the burst of directional beam discovery signals are transmitted based at least in part on the LBT procedure indicating the available communication resources, and receive a directional RACH signal during the RACH window.

A non-transitory computer readable medium for wireless communication at a base station is described. The non-transitory computer-readable medium may include instructions operable to cause a processor to determine that communication resources on a shared frequency spectrum band are available for use during a beam discovery window based at least in part on an LBT procedure, transmit a burst of directional beam discovery signals during the beam discovery window based at least in part on the LBT procedure indicating available communication resources, identify a timing of a RACH window that begins after the burst of directional beam discovery signals are transmitted based at least in part on the LBT procedure indicating the available communication resources, and receive a directional RACH signal during the RACH window.

Some examples of the method, apparatus, and non-transitory computer-readable medium described above may further include processes, features, means, or instructions for signaling the timing of the RACH window using at least one of burst of directional beam discovery signals.

Some examples of the method, apparatus, and non-transitory computer-readable medium described above may further include processes, features, means, or instructions for identifying a first communication resource used for the RACH window. Some examples of the method, apparatus, and non-transitory computer-readable medium described above may further include processes, features, means, or instructions for transmitting the burst of directional beam discovery signals until a beginning of the first communication resources used for the RACH window.

Some examples of the method, apparatus, and non-transitory computer-readable medium described above may further include processes, features, means, or instructions for identifying a first communication resource used for a RACH window. Some examples of the method, apparatus, and non-transitory computer-readable medium described above may further include processes, features, means, or instructions for transmitting the burst of directional beam discovery signals until a second communication resource occurring before the first communication resource.

Some examples of the method, apparatus, and non-transitory computer-readable medium described above may further include processes, features, means, or instructions for identifying a last communication resource used for the beam discovery window. Some examples of the method, apparatus, and non-transitory computer-readable medium described above may further include processes, features, means, or instructions for transmitting the burst of directional beam discovery signals until and including the last communication resource used for the beam discovery window.

Some examples of the method, apparatus, and non-transitory computer-readable medium described above may further include processes, features, means, or instructions for seling a starting location for the RACH window to allow the burst of directional beam discovery signals to include a transmitted beam in each beam direction associated with the base station.

Some examples of the method, apparatus, and non-transitory computer-readable medium described above may further include processes, features, means, or instructions for determining that the RACH window begins after the beam discovery window.

Some examples of the method, apparatus, and non-transitory computer-readable medium described above may further include processes, features, means, or instructions for identifying a last communication resource of the beam discovery window, wherein the RACH window begins at a first available communication resource after the last communication resource.

Some examples of the method, apparatus, and non-transitory computer-readable medium described above may further include processes, features, means, or instructions for identifying a starting time of the RACH window based at least in part on the LBT procedure indicating the available communication resources.

Some examples of the method, apparatus, and non-transitory computer-readable medium described above may further include processes, features, means, or instructions for transmitting the starting time of the RACH window using a PBCH of at least one of the burst of directional beam discovery signals.

Some examples of the method, apparatus, and non-transitory computer-readable medium described above may further include processes, features, means, or instructions for transmitting the starting time of the RACH window using a separate channel from the a PBCH of at least one of the burst of directional beam discovery signals, the separate channel being transmitted together with at least one of the burst of directional beam discovery signals using a same directional beam.

Some examples of the method, apparatus, and non-transitory computer-readable medium described above may further include processes, features, means, or instructions for listening in a unique direction during each RACH opportunity of the RACH window.

In some examples of the method, apparatus, and non-transitory computer-readable medium described above, each directional beam discovery signal of the burst of directional beam discovery signals may be pointed in a different beam direction.

A method of wireless communication at a UE is described. The method may include identifying a beam discovery window and a timing of a RACH window relative to the beam discovery window in a shared frequency spectrum band based at least in part on a single control signal received from a base station, wherein the RACH window is located in a fixed position relative to the beam discovery window, receiving a burst of directional beam discovery signals transmitted during the beam discovery window, and transmitting a directional RACH signal during the RACH window.

An apparatus for wireless communication at a UE is described. The apparatus may include means for identifying a beam discovery window and a timing of a RACH window relative to the beam discovery window in a shared frequency spectrum band based at least in part on a single control signal received from a base station, wherein the RACH window is located in a fixed position relative to the beam discovery window, means for receiving a burst of directional beam discovery signals transmitted during the beam discovery window, and means for transmitting a directional RACH signal during the RACH window.

Another apparatus for wireless communication at a UE is described. The apparatus may include a processor, memory in electronic communication with the processor, and instructions stored in the memory. The instructions may be operable to cause the processor to identify a beam discovery window and a timing of a RACH window relative to the beam discovery window in a shared frequency spectrum band based at least in part on a single control signal received from a base station, wherein the RACH window is located in a fixed position relative to the beam discovery window, receive a burst of directional beam discovery signals transmitted during the beam discovery window, and transmit a directional RACH signal during the RACH window.

A non-transitory computer readable medium for wireless communication at a UE is described. The non-transitory computer-readable medium may include instructions operable to cause a processor to identify a beam discovery window and a timing of a RACH window relative to the beam discovery window in a shared frequency spectrum band based at least in part on a single control signal received from a base station, wherein the RACH window is located in a fixed position relative to the beam discovery window, receive a burst of directional beam discovery signals transmitted during the beam discovery window, and transmit a directional RACH signal during the RACH window.

In some examples of the method, apparatus, and non-transitory computer-readable medium described above, the directional RACH signal may be transmitted after the burst of directional beam discovery signals may be received.

In some examples of the method, apparatus, and non-transitory computer-readable medium described above, the directional RACH signal may be transmitted before the burst of directional beam discovery signals may be received.

In some examples of the method, apparatus, and non-transitory computer-readable medium described above, the RACH window may be positioned after a first portion of the burst of directional beam discovery signals may be received and before a second portion of the burst of directional beam discovery signals may be received.

In some examples of the method, apparatus, and non-transitory computer-readable medium described above, the RACH window may be positioned before the beam discovery window.

In some examples of the method, apparatus, and non-transitory computer-readable medium described above, the RACH window may be positioned after the beam discovery window.

In some examples of the method, apparatus, and non-transitory computer-readable medium described above, the RACH window may be positioned during the beam discovery window.

Some examples of the method, apparatus, and non-transitory computer-readable medium described above may further include processes, features, means, or instructions for receiving a control signal from the base station that indicates the beam discovery window and the RACH window.

A method of wireless communication at a base station is described. The method may include determining that communication resources on a shared frequency spectrum band are available for use during a beam discovery window based at least in part on an LBT procedure, determining a timing of a RACH window relative to the beam discovery window that is located in a fixed position relative to the beam discovery window, transmitting a control signal to a target UE that indicates the beam discovery window and a RACH window in the shared frequency spectrum band based at least in part on determining the RACH window, transmitting a burst of directional beam discovery signals during the beam discovery window, and receiving a directional RACH signal during the RACH window.

An apparatus for wireless communication at a base station is described. The apparatus may include means for determining that communication resources on a shared frequency spectrum band are available for use during a beam discovery window based at least in part on an LBT procedure, means for determining a timing of a RACH window relative to the beam discovery window that is located in a fixed position relative to the beam discovery window, means for transmitting a control signal to a target UE that indicates the beam discovery window and a RACH window in the shared frequency spectrum band based at least in part on determining the RACH window, means for transmitting a burst of directional beam discovery signals during the beam discovery window, and means for receiving a directional RACH signal during the RACH window.

Another apparatus for wireless communication at a base station is described. The apparatus may include a processor, memory in electronic communication with the processor, and instructions stored in the memory. The instructions may be operable to cause the processor to determine that communication resources on a shared frequency spectrum band are available for use during a beam discovery window based at least in part on an LBT procedure, determine a timing of a RACH window relative to the beam discovery window that is located in a fixed position relative to the beam discovery window, transmit a control signal to a target UE that indicates the beam discovery window and a RACH window in the shared frequency spectrum band based at least in part on determining the RACH window, transmit a burst of directional beam discovery signals during the beam discovery window, and receive a directional RACH signal during the RACH window.

A non-transitory computer readable medium for wireless communication at a base station is described. The non-transitory computer-readable medium may include instructions operable to cause a processor to determine that communication resources on a shared frequency spectrum band are available for use during a beam discovery window based at least in part on an LBT procedure, determine a timing of a RACH window relative to the beam discovery window that is located in a fixed position relative to the beam discovery window, transmit a control signal to a target UE that indicates the beam discovery window and a RACH window in the shared frequency spectrum band based at least in part on determining the RACH window, transmit a burst of directional beam discovery signals during the beam discovery window, and receive a directional RACH signal during the RACH window.

Some examples of the method, apparatus, and non-transitory computer-readable medium described above may further include processes, features, means, or instructions for broadcasting a single channel reservation signal to a plurality of UEs that reserves communication resources of the shared frequency spectrum band for both a beam discovery procedure associated with the beam discovery window and a RACH procedure associated with the RACH window for the target UE based at least in part on the RACH window being positioned either before or after the beam discovery window.

Some examples of the method, apparatus, and non-transitory computer-readable medium described above may further include processes, features, means, or instructions for interrupting a transmission of the burst of directional beam discovery signals to listen for the directional RACH signal during the RACH window based at least in part on the RACH window being positioned with the beam discovery window.

Some examples of the method, apparatus, and non-transitory computer-readable medium described above may further include processes, features, means, or instructions for resuming the transmission of the burst of directional beam discovery signals after the RACH window may be finished.

In some examples of the method, apparatus, and non-transitory computer-readable medium described above, the directional RACH signal may be received before, during, or after the burst of directional beam discovery signals may be transmitted.

In some examples of the method, apparatus, and non-transitory computer-readable medium described above, the RACH window may be positioned before, during, or after the beam discovery window.

Some examples of the method, apparatus, and non-transitory computer-readable medium described above may further include processes, features, means, or instructions for transmitting a single control signal to the target UE that indicates the beam discovery window and the RACH window.

DETAILED DESCRIPTION

Figure 1:
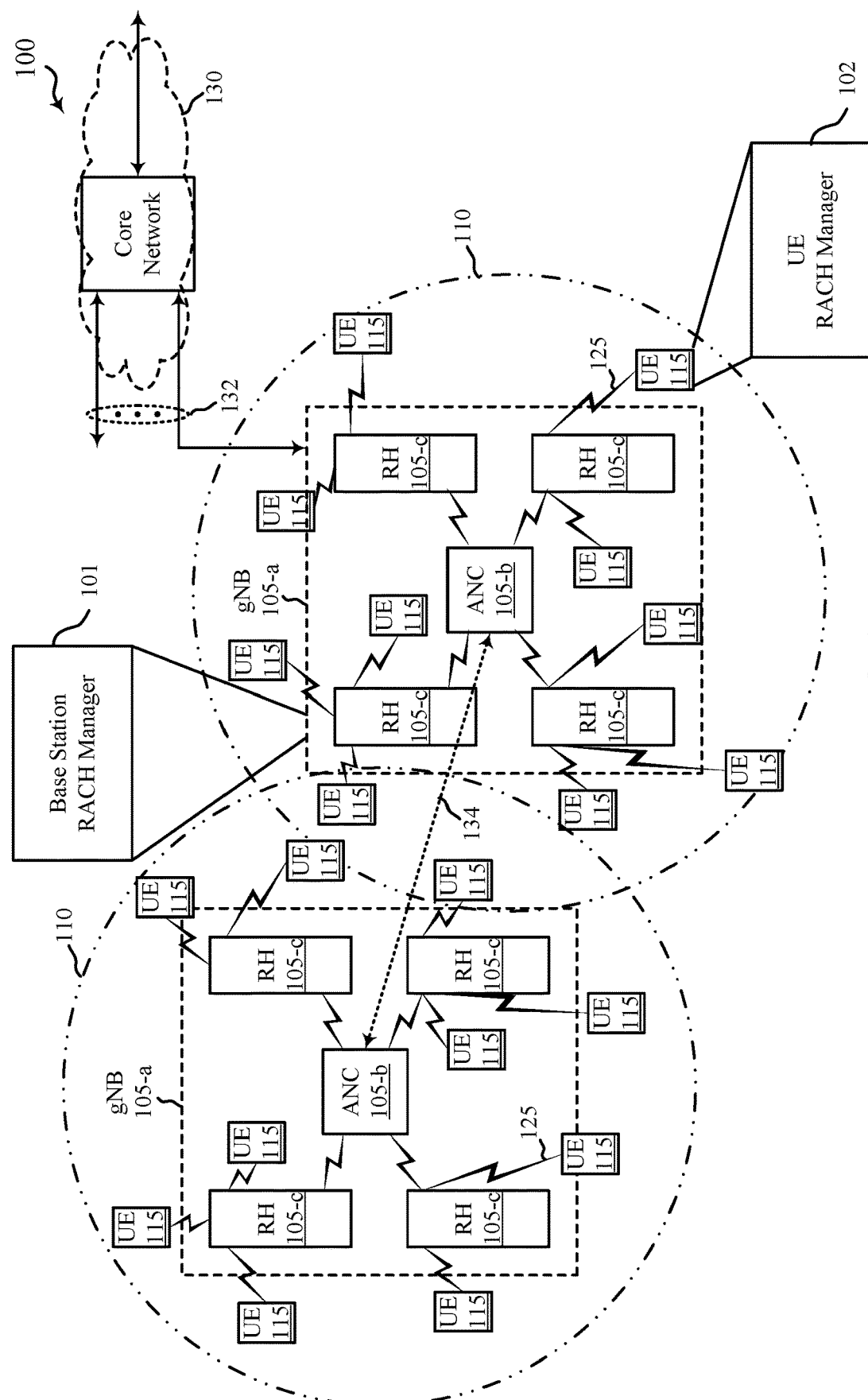
FIG. 1 illustrates an example of a system for wireless communication that supports RACH window design in mmW shared spectrum in accordance with one or more aspects of the present disclosure.

Some wireless communication systems may operate using a shared radio frequency spectrum band and in the mmW spectrum. At times in such wireless communication systems, a RACH procedure may fail due to misalignment of directional beams between a base station and a UE. In some cases, it may be advantageous to coordinate a RACH procedure with a beam discovery procedure to improve a likelihood of success of the RACH procedure when compared to a blind RACH procedure. For example, a discovery reference signal (DRS) measurement timing configuration (DMTC) window may be used to transmit synchronization signals (SSs). In some cases, a burst of SSs may be transmitted subject to passing of a listen-before-talk (LBT) procedure (e.g., a one-shot LBT procedure). When a failure of the LBT occurs, the transmission of the SS burst may be delayed, truncated, or truncation with extension. As such, coordinating a RACH procedure with a beam discovery procedure (e.g., a trigger mechanism for the UE to perform the RACH procedure) may be useful in improving the likelihood of success of the RACH procedure.

Techniques are described herein for coordinating a RACH procedure with a beam discovery procedure. A timing and configuration of a RACH window may be coordinated with a beam discovery window. By coordinating the two windows, a UE may be configured to use information learned from the beam discovery procedure during the RACH procedure, thereby increasing the likelihood that the RACH procedure is successful. In some cases, the RACH procedure is triggered by the transmission of directional beam reference signals during the beam discovery window. In such cases, the UE determines the timing of the RACH window based at least in part on the receipt of the directional beam reference signals. In some cases, the RACH window is configured using a static configuration relative to the beam discovery window.

For example, each RACH transmission opportunity of the RACH window may be mapped to a specific beam direction transmitted during a beam discovery window. The UE may identify a beam reference signal with the highest signal quality from a burst of beam reference signals received from a base station during the beam discovery window. The UE may use the identified beam reference signal to determine a beam direction associated with the base station to use during the RACH procedure. The UE may select a specific RACH transmission opportunity that corresponds to the beam direction to transmit a RACH signal to the base station. During the specific RACH transmission opportunity the base station may be listening using a reception beam in the same beam direction that the identified beam reference signal was transmitted in.

Aspects of the disclosure are initially described in the context of a wireless communication system. Aspects of the disclosure are described in the context of communication schemes and procedure structures. Aspects of the disclosure are further illustrated by and described with reference to apparatus diagrams, system diagrams, and flowcharts that relate to RACH window design in mmW shared spectrum.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be an LTE network, an LTE-A network, or an NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB 105-a), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC) 105-b. Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads 105-c and access network controllers 105-b) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more the resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that can support simultaneous communications via carriers associated with more than one different carrier bandwidth.

Wireless communication system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Techniques are described herein for coordinating a RACH procedure with a beam discovery procedure. In mmW shared spectrum, a RACH window may be configured with multiple RACH transmission opportunities in one continuous piece (e.g., 10 RACH transmission opportunities configured to be transmitted continuously in time) so as to avoid interrupting regular traffic within the spectrum. A base station 105 may sweep through the multiple RACH opportunities, sweeping with one receive beam corresponsive to a transmit direction of each RACH opportunity. A timing and configuration of a RACH window may be coordinated with a beam discovery window. By coordinating the two windows, a UE 115 may be configured to use information learned from the beam discovery procedure during the RACH procedure, thereby increasing the likelihood that the RACH procedure is successful. In some cases, the RACH procedure is triggered by the transmission of directional beam reference signals during the beam discovery window. In such cases, the UE 115 determines the timing of the RACH window based at least in part on the receipt of the directional beam reference signals. In some cases, the RACH window is configured using a static configuration relative to the beam discovery window.

One or more of the base stations 105 may include a base station RACH manager 101, which may configure a timing of a RACH window based on a beam discovery window. In some dynamic configurations, initiating the RACH procedure and/or the RACH window may be based on transmitting one or more directional beam reference signals during the beam discovery window. In some static configurations, the RACH window may be configured in a fixed position relative to the beam discovery window UEs 115 may include a UE RACH manager 102, which may configure a timing of a RACH window based on a beam discovery window. In some dynamic configurations, initiating the RACH procedure and/or the RACH window may be based on receiving one or more directional beam reference signals during the beam discovery window. In some static configurations, the RACH window may be configured in a fixed position relative to the beam discovery window. In such case, the UE 115 may transmit RACH transmissions during the fixed RACH window without being triggered by a triggering mechanism (e.g., a successful LBT procedure triggering the RACH transmissions, etc.).

Figure 2:
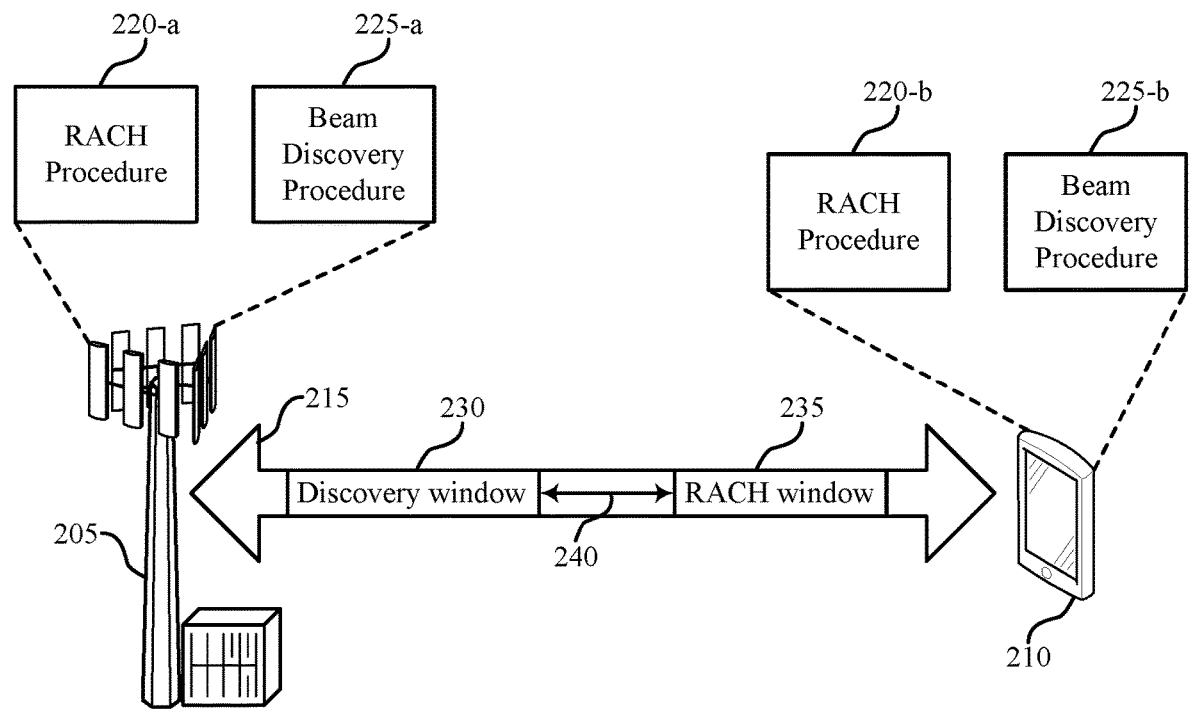
FIG. 2 illustrates an example of a wireless communication system that supports RACH window design in mmW shared spectrum in accordance with one or more aspects of the present disclosure.

FIG. 2 illustrates an example of a wireless communication system 200 that supports RACH window design in mmW shared spectrum in accordance with various aspects of the present disclosure. In some examples, the wireless communication system 200 may implement aspects of wireless communication system 100. The wireless communication system 200 may support directional communication links. In some cases, it may be advantageous to coordinate a RACH procedure 220 with a beam discovery procedure 225 to improve a likelihood of success of the RACH procedure 220 when compared to a blind RACH procedure. Coordination of the RACH procedure 220 and the beam discovery procedure 225 may further be complicated when using a shared radio frequency spectrum that utilizes a contention-based radio access technology (RAT). Accordingly, the wireless communication system 200 may include techniques for coordinating a RACH procedure 220 with a beam discovery procedure 225 when using a shared radio frequency spectrum. In some cases, windows of communication resources available for use by the different procedures (e.g., discovery window 230 or RACH window 235) may be coordinated using dynamic configurations or static configurations.

In the wireless communication system 200 a base station 205 and a UE 210 may be configured to exchange one or more signals 215 (or communications, transmissions, messages, etc.). The base station 205 and the UE 210 may be configured to implement one or more RACH procedures 220 to establish a communication link between the two devices and/or one or more beam discovery procedures to establish or refine directional communication links between the two devices. The base station 205 may be an example of the base stations 105 described with reference to FIG. 1. The UE 210 may be an example of the UE 115 described with reference to FIG. 1.

A beam discovery procedure 225 (sometimes referred to as a beam refinement procedure) may be executed during a discovery window 230. The discovery window 230 may comprise a collection of communication resources that may be used by the base station 205 to transmit directional beam reference signals or may be used by the UE 210 to listen for directional beam reference signals. The discovery window 230 may indicate communication resources when the base station 205 may attempt to transmit one or more directional beam reference signals, based at least in part on identifying that the communication resources are not being used by other devices (e.g., through an LBT procedure). For example, during the discovery window 230, the base station 205 may execute an LBT procedure. If the LBT procedure indicates that resources are available for use, the base station 205 may execute the beam discovery procedure 225 (or beam refinement procedure, as the case may be). The beam discovery procedure 225 may include transmitting a burst of directional beam discovery signals in a plurality of different directions. In some examples, each directional beam discovery signal of the burst is transmitted in a different direction than the other directional beam discovery signals of the burst. The discovery window 230 may occur in a periodic manner (e.g., according to a fixed schedule), an aperiodic manner, or in a dynamic manner (e.g., according decisions by one or more entities of the wireless communication system 200).

A RACH procedure 220 may be executed during a RACH window 235. The RACH window 235 may comprise a collection of communication resources that the base station 205 may use to listen for RACH signals or that that the UE 210 may use to transmit RACH messages. The RACH window 235 may indicate communication resources that the base station 205 may reserve to listen for RACH messages transmitted from the UEs 210 attempting to establish a communication link with the base station 205. For example, during the RACH window 235, the UE 210 may attempt to transmit one or more RACH signals. In some cases, transmitting RACH signals may be based on a successful outcome of an LBT procedure in a shared radio frequency spectrum band.

Techniques implemented by devices or entities of the wireless communication system 200 may coordinate a timing of the RACH window 235 with the discovery window 230 or the directional beam discovery signals transmitted by the base station 205. Several different relationships 240 between the RACH window 235 and the discovery window 230 are discussed herein. The UE 210 may use the information learned during a beam discovery procedure 225 to select one or more parameters for a RACH signal transmission. For example, the UE 210 may identify which directional beam discovery signal is strongest and transmit a RACH signal in a particular direction when the base station 205 is listening in a related direction. In some examples, the UE 115 may search and identify transmission of a burst of directional discovery reference signal during a discovery reference signal (DRS) measurement timing configuration (DMTC) window via a narrow band processing using, e.g., a time domain search algorithm. In such cases, the UE 115 may recover timings associated with the transmission of the burst (e.g., a synchronization signal (SS) symbol boundary, SS block timing, slot timing, etc.). In some cases, the UE 115 may not use a RACH opportunity in the same DMTC window because the UE 115 may not identify the transmission of the burst within the DMTC window in time to use an RACH opportunity within the DMTC window. For example, the time domain search algorithm may not operate fast enough and by the time the UE 115 determines the transmission of the burst within the DMTC window, the UE 115 may have already missed the RACH opportunity or RACH window within the DMTC window. In some examples, the UE 115 may need to read remaining minimum system information (RMSI) to obtain parameters necessary to perform the RACH procedure. As such, the UE 115 may use a RACH window in a subsequent DMTC window. In such cases, the UE 115 may still detect the transmission of the burst to confirm the RACH window in the subsequent DMTC window is usable (e.g., the base station 105 has performed a successful LBT procedure, and thus, may reliably pick up the RACH transmissions from the UE 115). In some cases, the UE 115 may not detect the transmission of the burst using the same time domain search algorithm since the UE 115 knows a timing of the RACH window and a physical cell identity (PCI). For example, the UE 115 may use wide band processing and may detect the transmission of the burst signaled via a PBCH or a separate L1 channel, or may still use a narrow band processing with a frequency domain detection algorithm, which may be simpler than the time domain search algorithm. As such, the UE 115 may start the RACH procedure in a right RACH opportunity when the UE 115 identifies the transmission of the burst and other parameters of the RACH window (e.g., an offset between a last transmission opportunity of the burst and a first transmission opportunity of the RACH window).

In some examples, the RACH window 235 is dynamically triggered based on one or more directional discovery signals being transmitted by the base station 205. In a shared radio frequency spectrum, RACH signals transmitted blindly by the UE 210 may not be successfully decoded by the base station 205 due to interference from other devices using the shared frequency spectrum band. To improve the likelihood that the RACH signals reach the base station 205, the UE 210 may execute the RACH procedure 220-b based on knowledge that communication resources are available for use (e.g., an LBT procedure). In some cases, however, the UE 210 may not be able to execute an LBT procedure. The UE 210 may use the reception of one or more directional beam discovery signals as a proxy for an LBT procedure. Before transmitting a directional beam discovery signal during a discovery window 230, the base station 205 may determine the communication resources are available for use by using an LBT procedure or similar procedure. If the UE 210 receives or successfully decodes one or more directional beam discovery signals (sometimes referred to as directional beam reference signals), the UE 210 may infer that certain communication resources are available to be used for a RACH procedure. As such, the UE 210 may determine a timing of the RACH window 235 based on receiving a directional beam discovery signal. Similarly, the base station 205 may execute the RACH procedure 220-a based on an LBT procedure determining that communication resources are available. If the base station 205 does not identify available communication resources (e.g., using the LBT procedure), the base station 205 may not execute the RACH procedure 220-a.

In some examples, the RACH window 235 may be statically configured relative to the discovery window 230. In such examples, the RACH window 235 may be positioned before, during, or after the discovery window 230. The base station 205 and the UE 210 may execute the RACH procedure 220 regardless of whether communication resources are indicated as being available (e.g., through an LBT procedure) and/or a directional beam discovery signal is transmitted. In some examples, the RACH window 235 may be configured independently of the discovery window 230.

Information regarding the timing of the RACH procedure 220 and/or the RACH window 235 may be communicated in a variety of different methods. In some examples, information regarding the RACH window 235 and/or RACH procedure 220 may be communicated using a physical broadcast channel (PBCH) of the directional beam discovery signal. In some examples, an index value of directional beam discovery signals may be used to determine information about the RACH procedure 220 and/or the RACH window 235. In some examples, information regarding the RACH procedure 220 and/or the RACH window 235 may be transmitted using a different channel from the directional beam discovery signals (e.g., a L1 channel).

Figure 3:
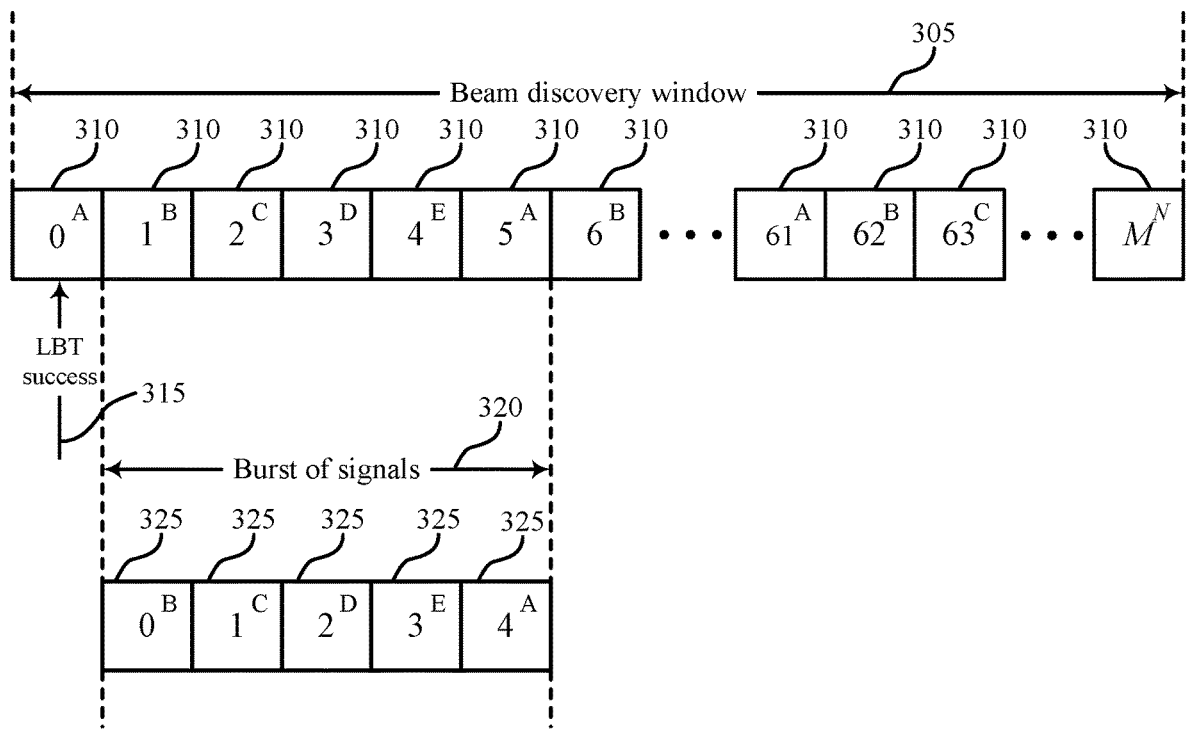
FIG. 3 illustrates an example of a beam discovery procedure structure that supports RACH window design in mmW shared spectrum in accordance with one or more aspects of the present disclosure.

FIG. 3 illustrates an example of a beam discovery procedure structure 300 that supports RACH window design in mmW shared spectrum in accordance with various aspects of the present disclosure. In some examples, the beam discovery procedure structure 300 may implement aspects of the wireless communication systems 100 or 200. The beam discovery procedure structure 300 may illustrate how transmission of directional beam reference signals 325 occur in relation to a beam discovery window 305 during a beam discovery procedure. The beam discovery window 305 (sometimes referred to as a beam reference window or a beam reference window) may be an example of the discovery window 230 described with reference to FIG. 2.

The beam discovery window 305 may include a plurality of transmission opportunities 310. The transmission opportunities 310 may represent communication resources that a base station 205 may attempt to use to transmit one or more beam reference signals 325 in a shared radio frequency spectrum that uses a contention-based RAT. The beam discovery window 305 may include any number, M, of transmission opportunities 310. In some examples, the number of transmission opportunities 310 in a beam discovery window 305 may be four, six, eight, ten, twelve, fourteen, sixteen, eighteen, twenty, thirty-two, sixty-four, or any number of transmission opportunities. A transmission opportunity 310 may be an example of a single slot, a single sub-frame, a single frame, a single resource block, or some other division of communication resources.

In a directional wireless communication system (such as a millimeter wave system), each transmission opportunity 310 may be indexed to a specific beam direction of a directional beam reference signal 325. In such systems, the beam discovery window 305 may be designed such that a beam reference signal is configured to be transmitted in a predetermined direction during a specific transmission opportunity 310. For example, if a wireless communication system includes five unique beam directions for transmission (e.g., beam directions A, B, C, D, and E), transmission opportunities 0, 1, 2, 3, and 4 of the beam discovery window 305 may each be mapped to one of the beam directions A, B, C, D, and E, respectively. The transmission opportunities 310 may be mapped to beam directions A, B, C, D, and E until the entire beam discovery window 305 is mapped. This example just illustrates five unique beam directions A, B, C, D, and E. In other wireless communication systems, the beam discovery window 305 may be mapped to any number of unique beam directions N, such as two, three, four, five, six, seven, eight, nine, ten, eleven, twelve, thirteen, fourteen, fifteen, sixteen, seventeen, eighteen, nineteen, twenty, twenty-one, twenty-two, twenty-three, twenty-four, twenty-five, twenty-six, twenty-seven, twenty-eight, twenty-nine, thirty, thirty-one, thirty-two, etc. In some cases, the beam discovery window 305 may be an example of a discovery reference signal (DRS) measurement timing configuration (DMTC).

When performing a beam discovery procedure, a base station 205 may execute an LBT procedure to determine if communication resources during a beam discovery window 305 are available for use by the base station 205. If the LBT is successful (e.g., at 315) and the base station 205 identifies available resources, the base station 205 may transmit a burst 320 of directional beam reference signals 325. The LBT procedure may be successful at any point during the beam discovery window 305. In some examples, the burst 320 may comprise one cycle of indexes. For example, if there are five unique beam directions in a wireless communication system, the burst 320 may include the transmission of five directional beam reference signals 325, one for each direction of the unique beam directions. In some cases, the burst 320 may include two or more cycles of directional beam reference signals 325. In some cases, the number of directional beam reference signals 325 transmitted during a burst 320 may be independent of the number of unique beam directions. For example, the number of directional beam reference signals 325 transmitted in a burst 320 may be a predetermined number of transmission. In some examples, the base station 205 may be configured to transmit directional beam reference signals 325 until the beam discovery window 305 concludes after the LBT procedure is successful.

The beam direction of the directional beam reference signal 325 transmitted by the base station 205 may be based on the index of the associated transmission opportunity 310 of the beam discovery window 305. For example, if a directional beam reference signal 325 is being transmitted during transmission opportunity 1 of the beam discovery window 305, which is mapped to beam direction B, the directional beam reference signal 325 may be transmitted in beam direction B.

In some cases, the base station 205 transmits the burst 320 of signals at the first available opportunity after the LBT is successful. In some cases, the burst 320 of signals may be cut-off at the end of the discovery window. For example, if the burst 320 typically includes five transmissions and there are only four transmission opportunities left in the beam discovery window 305 after LBT is successful, the base station 205 may transmit only four directional beam reference signals 325 as part of the burst.

Figure 4:
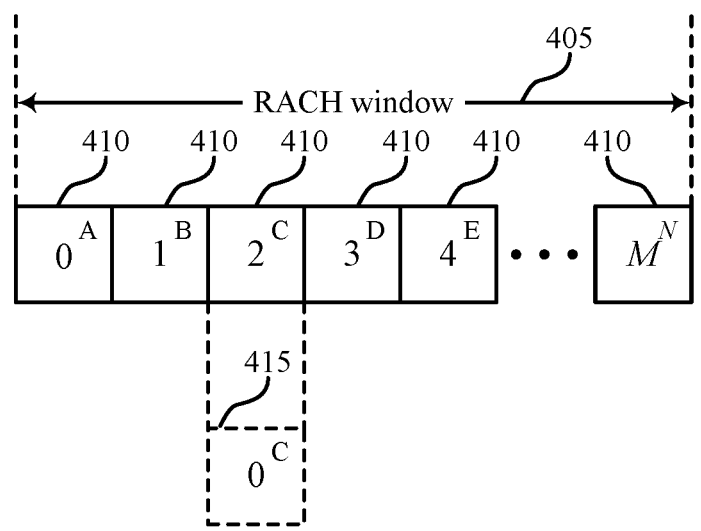
FIG. 4 illustrates an example of a RACH procedure structure that supports RACH window design in mmW shared spectrum in accordance with one or more aspects of the present disclosure.

FIG. 4 illustrates an example of a RACH procedure structure 400 that supports RACH window design in mmW shared spectrum in accordance with various aspects of the present disclosure. In some examples, the RACH procedure structure 400 may implement aspects of the wireless communication systems 100 or 200. The RACH procedure structure 400 may illustrate how transmission of RACH signals 415 occur in relation to a RACH window 405. In addition, the RACH procedure structure 400 may illustrate how the indexing of the RACH window 405 may relate to the indexing of a beam discovery window (e.g., beam discovery window 305). The RACH window 405 may be an example of the RACH window 235 described with reference to FIG. 2.

The RACH window 405 may include a plurality of transmission opportunities 410. The transmission opportunities 410 may represent communication resources that a UE 210 may attempt to use to transmit one or more RACH signals 415 in a shared radio frequency spectrum that uses a contention-based RAT. The RACH window 405 may include any number, M, of transmission opportunities 410. In some examples, the number of transmission opportunities 410 in a RACH window 405 may be four, six, eight, ten, twelve, fourteen, sixteen, eighteen, twenty, thirty-two, sixty-four, or any number of transmission opportunities. A transmission opportunity 410 may be an example of a single slot, a single sub-frame, a single frame, a single resource block, or some other division of communication resources. During a transmission opportunity 410, the base station 205 may be configured to listen in a particular beam direction using a reception beam and the UE 210 may be configured to transmit a RACH signal 415, whether directionally or not.

In a directional wireless communication system (such as a millimeter wave system), each transmission opportunity 410 may be indexed to a specific beam direction. In some cases, the transmission opportunities 410 may be indexed to beam directions associated with the base station 205. During a RACH procedure, the base station 205 may listen in the specified direction using a reception beam during each transmission opportunity 410. The specified listening directions may be related to the transmission directions of the directional beam reference signals 325. If the listening directions are correlated with the transmission directions of reference signals, the UE 210 may be configured to use reference signals to determine during what listening direction the base station 205 is most likely to receive a RACH signal 415. In the specific example of FIG. 4, the RACH window 405 includes five transmission opportunities 410, one for each of the five unique beam directions A, B, C, D, and E of the base station 205. In some examples, the RACH window 405 may include any number of transmission opportunities, with any type of indexing, and/or any number of cycles as discussed above with reference to the beam discovery window 305.

During a RACH window 405, the UE 210 may be configured to transmit RACH signals 415 using all of the transmission opportunities 410. In some examples, the UE 210 may be configured to transmit one or more RACH signals 415 using a subset of transmission opportunities 410 that is less than all of the transmission opportunities 410. For example, if the UE 210 determines that the directional beam reference signal transmitted in beam direction C is the best received signal, the UE 210 may transmit a single RACH signal 415 during the RACH window 405 while the base station 205 is listening in beam direction C. Based on the beam discovery procedure, the UE 210 may modify one or more parameters of the RACH signals 415 transmitted during a RACH window 405, including the number of RACH signals transmitted, the transmission power, the transmission direction (or beam direction), other parameters, or combinations thereof.

In some examples, the RACH window 405 may be configured by information included in a remaining minimum system information (RMSI) that includes multiple RACH transmission opportunities. For example, RMSI indicates where the RACH window 405 may be. In some cases, each RACH transmission opportunity 410 may correspond to one base station beam direction. For example, the RMSI may provide the information to map an index of a directional beam discovery signal to one RACH transmission opportunity 410. In some examples, a RACH window 405 include multiple RACH transmission opportunities 410 mapped to a single index of a directional beam discovery signal or a single beam direction.

Figure 5:
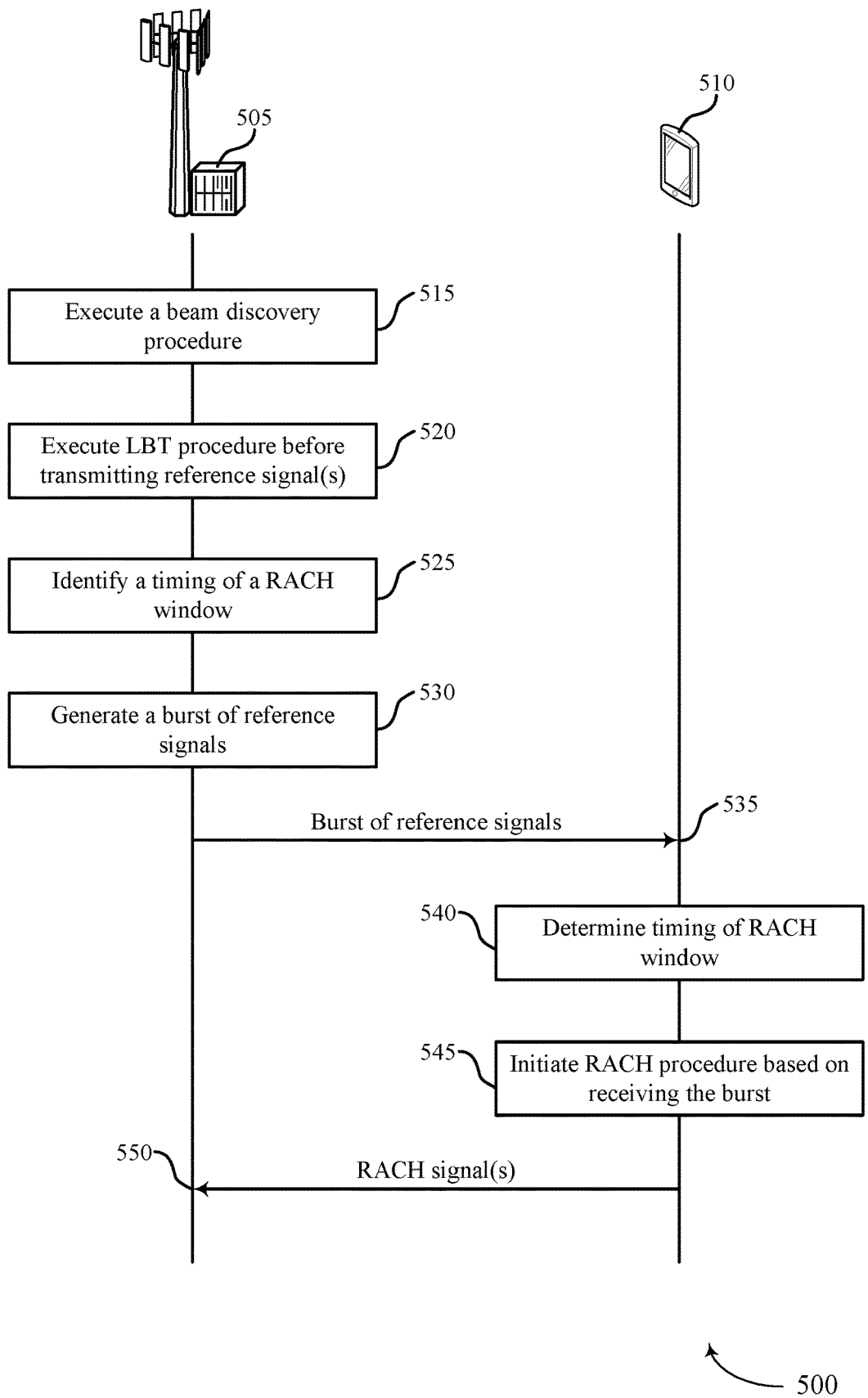
FIG. 5 illustrates an example of a communication scheme that supports RACH window design in mmW shared spectrum in accordance with one or more aspects of the present disclosure.

FIG. 5 illustrates an example of a communication scheme 500 that supports RACH window design in mmW shared spectrum in accordance with various aspects of the present disclosure. In some examples, the communication scheme 500 may implement aspects of the wireless communication systems 100 or 200. The communication scheme 500 illustrates a dynamic configuration for a RACH window, where a RACH procedure may be triggered by the transmission/receipt of directional beam reference signals. In the dynamic configuration, if directional beam reference signals are not transmitted, a RACH procedure may not be executed by either the base station 505 or the UE 510 and a RACH window may not occur. The base station 505 may be an example of the base stations 105, 205 described with reference to FIGS. 1 and 2. The UE 510 may be an example of the UEs 115, 210 described with reference to FIGS. 1 and 2.

At 515, the base station 505 may execute a beam discovery procedure. The base station 505 may determine one or more characteristics of a beam discovery window such as the length of the beam discovery window, the number of unique beam directions, a mapping of beam directions to discovery windows, the size of a transmission opportunity (slot, sub-frame, resource block, duration of time, etc.), other characteristics, or combinations thereof.

At 520, the base station 505 may execute an LBT procedure before transmitting one or more directional beam discovery signals. The base station 505 may use the LBT procedure to determine whether communication resources are available for use by the base station 505 in a shared radio frequency spectrum. In some examples, the base station 505 other types of procedures to determine whether communication resources are available in a contention-based RAT.

At 525, the base station 505 may identify a timing of a RACH window based on the communication resources being available for use during a beam discovery window. In a dynamic configuration, a RACH procedure is triggered by the LBT procedure being successful during a beam discovery window. As such, the base station 505 may determine one or more characteristics of the RACH procedure and/or RACH window based on the LBT procedure being successful. The characteristics of the RACH procedure and/or the RACH window may include the start time of the RACH window, the number of transmission opportunities in the RACH window, the mapping of beam directions to transmission opportunities, an offset between the end of the burst of directional beam reference signals 535 and the beginning of the RACH window, other characteristics, or combinations thereof. In some examples, the functions of block 525 may occur based on the base station 505 transmitting at least one directional beam reference signal.

At 530, the base station 505 may generate a burst of directional beam reference signals 535. The base station 505 may determine one or more characteristics of a burst of directional beam reference signals 535 that may be transmitted if an LBT procedure is successful during the beam discovery window. Such characteristics may include, the number of signals to be transmitted in a burst, the number of beam direction cycles to be transmitted in a burst, an offset of transmission opportunities between the LBT procedure being successful and the first transmission, other characteristics, or combinations thereof. The base station 505 may transmit the burst of directional beam reference signals 535.

At 540, the UE 510 may determine the timing of the RACH window and/or other characteristics about the RACH procedure and/or the RACH window based on receiving the burst of directional beam reference signals 535. In a dynamic configuration, the UE 510 may wait to initiate a RACH procedure until after the UE 510 receives and/or successfully decodes at least one directional beam reference signal from the base station 505. In directional communication systems, beam misalignment may cause the base station 505 not to receive a RACH signal 550. If the UE 510 transmits a RACH signal 550 while the base station 505 is listening in the wrong direction, the base station 505 may not receive the RACH signal 550 even though it is in range. To avoid an inefficient use of communication resources, the UE 510 may initiate the RACH window based on receiving at least one directional beam reference signal from the base station 505. In addition, receiving at least one directional beam reference signal from the base station 505 may indicate to the UE 510 that communication resources are available for it to use for a RACH procedure.

The UE 510 may determine one or more characteristics about the RACH procedure and/or the RACH window based on receiving the at least one directional beam reference signal from the base station 505. For example, the UE 510 may determine the start time of the RACH window, the number of transmission opportunities in the RACH window, the mapping of beam directions to transmission opportunities, an offset between the end of the burst of directional beam reference signals 535 and the beginning of the RACH window, other characteristics, or combinations thereof. In some examples, information regarding the RACH window and/or RACH procedure may be communicated using a PBCH of the directional beam discovery signal. In some examples, the index value associated with the decoded directional beam reference signal may indicate information about the RACH procedure and/or RACH window. In some examples, L1 signaling may indicate information about the RACH procedure and/or RACH window.

At 545, the UE 510 may initiate a RACH procedure during the RACH window based on receiving the burst of directional beam reference signals 535. The RACH procedure may include some of the features discussed with reference to FIG. 4. For example, the UE 510 may transmit RACH signals 550 in all of the transmission opportunities of the RACH window. In some examples, the UE 510 may identify one or more beam indexes based on receiving directional beam reference signals. The UE 510 may transmit RACH signals only during the RACH transmission opportunities that correspond to the identified beam indexes of the received directional beam reference signals.

Figure 6:
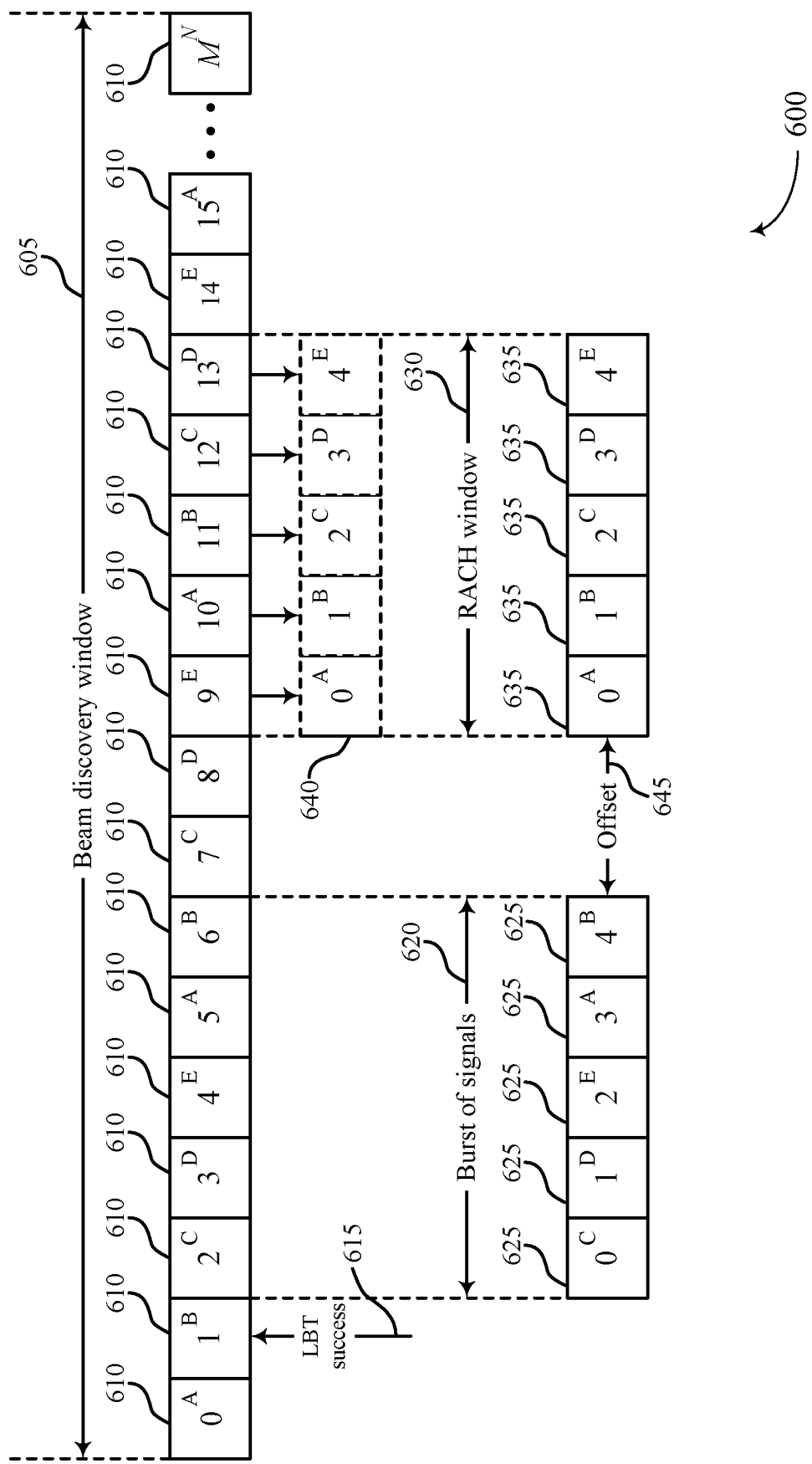
FIG. 6 illustrates an example of a procedure structure that supports RACH window design in mmW shared spectrum in accordance with one or more aspects of the present disclosure.

FIG. 6 illustrates an example of a procedure structure 600 that supports RACH window design in mmW shared spectrum in accordance with various aspects of the present disclosure. In some examples, the procedure structure 600 may implement aspects of the wireless communication systems 100 or 200. The procedure structure 600 may illustrate an example of the dynamic communication scheme 500 described with reference to FIG. 5. As such, the procedure structure 600 illustrates a beam discovery window 605 with a plurality of transmission opportunities 610, an LBT success 615, a burst 620 of directional beam reference signals 625, a RACH window 630 with one or more RACH signals 635, and a plurality of RACH transmission opportunities 640.

The beam discovery window 605 may be an example of the discovery windows 230, 305 described with reference to FIGS. 2-5. The transmission opportunities 610 may be an example of the transmission opportunities 310 described with reference to FIGS. 3-5. The LBT success 615 may be an example of the LBT procedures described with reference to FIGS. 3-5. The burst 620 may be an example of the burst 320 described with reference to FIGS. 3-5. The directional beam reference signals 625 may examples of the directional beam reference signals 325 (sometimes referred to as directional beam discovery signals or directional beam refinement signals) described with reference to FIGS. 2-5. The RACH window 630 may be an example of the RACH windows 235, 405 described with reference to FIGS. 2-5. The RACH signals 635 may be examples of the RACH signals 415 described with reference to FIGS. 2-5. The RACH transmission opportunities 640 may be examples of the RACH transmission opportunities 410 described with reference to FIGS. 4-5.

At the LBT success 615, the base station 505 may determine that communication resources are available for use in the shared radio frequency spectrum band based on an LBT procedure. The base station 505 may generate and transmit the burst 620 of directional beam reference signals 625. The base station 505 may also determine one or more characteristics of the RACH procedure and/or RACH window 630. The base station 505 may communicate these one or more characteristics to the UE 510 using a variety of methods.

In a dynamic configuration of a RACH procedure, the starting time of a RACH window 630 and other characteristics may be based on the transmission opportunity 610 where the LBT procedure was successful. The UE 510 may determine the characteristics of the RACH window 630 based on receiving the burst 620 of directional beam reference signals 625.

In some examples, an offset 645 exists between the last transmission of the burst 620 and the first RACH transmission opportunity 640 of the RACH window 630. The offset 645 may be configured to give the UE 510 time to analyze the burst 620 of directional beam reference signals 625 and beam direction information to use during the RACH procedure. In some examples, the offset 645 may be zero, where the RACH window starts immediately after the last transmission of the burst 620. In some examples, the offset 645 is set such that the RACH window 630 begins after the last transmission opportunity 610 of the beam discovery window 605. In some examples, the base station 505 may use the transmission opportunities 610 that are associated with the offset 645 to transmit additional directional beam discovery signals 625 after the burst 620 is complete.

In some examples, the offset 645 is set such that the RACH window 630 begins during the beam discovery window 605. In such examples, the base station 505 may repurpose one or more of the transmission opportunities 610 to be RACH transmission opportunities 640. To do this, the base station 505 may listen in different beam directions than indicated by the beam discovery window. For example, instead of attempting to transmit a directional beam reference signal 625 in beam direction E during transmission opportunity 9, the base station 505 may listen in beam direction A during RACH transmission opportunity 0 of the RACH window 630. In some examples, if the RACH window 630 extends beyond the last transmission opportunity 610 of the beam discovery window 605, the base station 505 and the UE 510 will complete the RACH procedure, regardless of what occurs with the beam discovery window 605.

Figure 7:
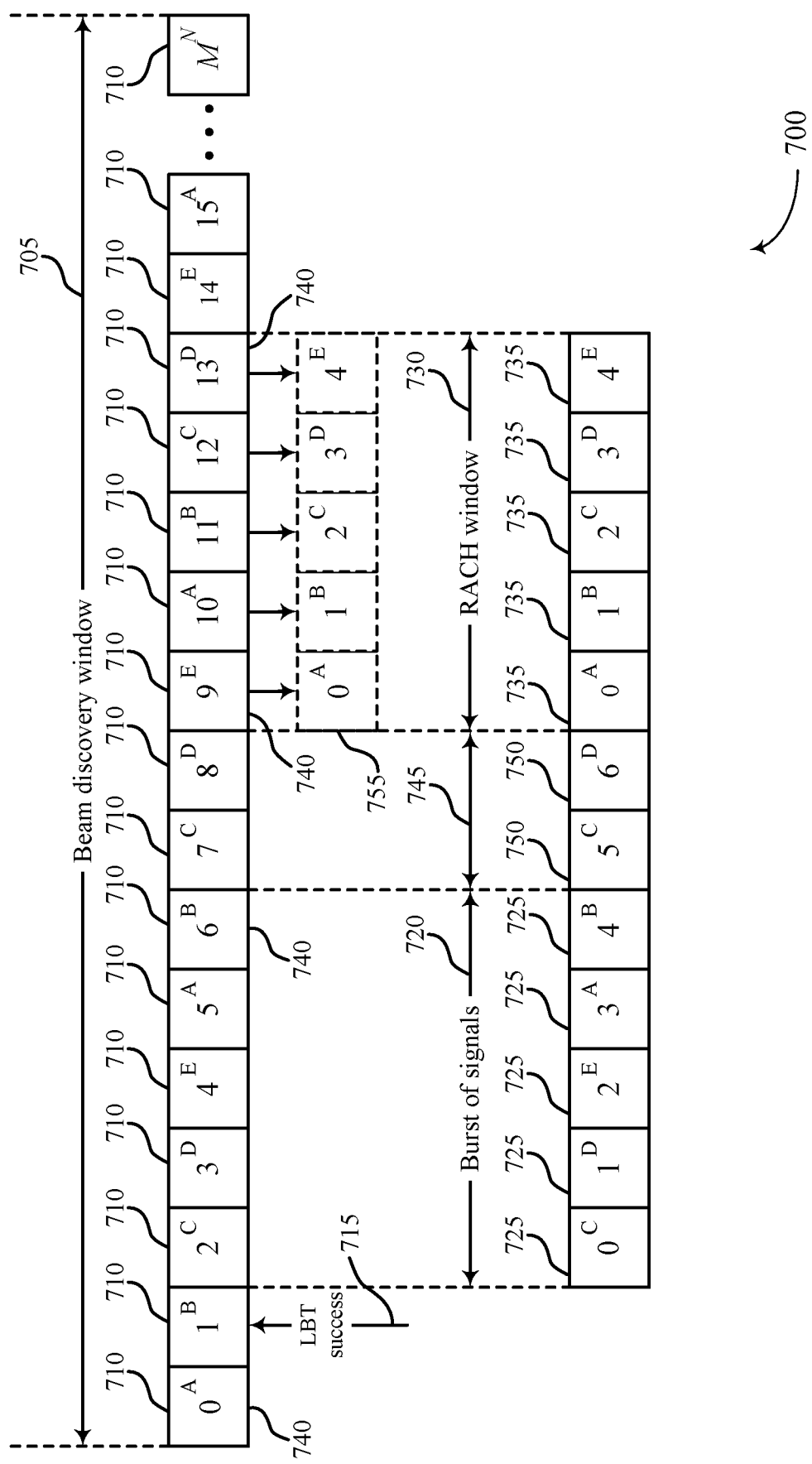
FIG. 7 illustrates an example of a procedure structure that supports RACH window design in mmW shared spectrum in accordance with one or more aspects of the present disclosure.

FIG. 7 illustrates an example of a procedure structure 700 that supports RACH window design in mmW shared spectrum in accordance with various aspects of the present disclosure. In some examples, the procedure structure 700 may implement aspects of the wireless communication systems 100 or 200. The procedure structure 700 may be another example of the dynamic communication scheme 500 described with reference to FIG. 5. As such, the procedure structure 700 includes many of the same features as the communication scheme 500 and the procedure structure 600 described with reference to FIGS. 5-6 and full descriptions of those elements are not repeated here. The procedure structure 700 illustrates a different method of determining the timing of a RACH window 730 based on the transmission of the burst 720 of directional beam reference signals 725. In this method, the UE 510 may need to know where the RACH window starts, and since the base station 505 knows where the RACH window starts the base station 505 may transmit a channel reservation to reserve a channel until a last transmission opportunity of the RACH window. In such cases, the base station 505 may know a location of the RACH window since the base station 505 may transmit the burst 720 after passing a listen-before-talk (LBT) procedure, know a length of the burst 720 that it transmits after passing of the LBT, and configure the RACH window to follow the burst 720. For example, once the base station 505 passes the LBT at a certain point in time, the base station 505 may identify a point in time at which the base station 505 can transmit the burst 720 relative to the certain point in time, start to transmit the burst 720 at the identified point in time, and configure the location of the RACH window. Additionally or alternatively, the base station 505 may provide a signaling support to the UE 510 to indicate where the RACH window starts by transmitting information including an offset between the last transmission opportunity of the burst and a first transmission opportunity of the RACH window. In some cases, the offset to each directional beam reference signal 725 may not be signaled to the UE 510 since such offset information may lead to a different information being transmitted to the UE 510 over time and may result in a problem for soft combining. In some cases, the base station 505 may transmit the offset information through an L1 channel (e.g., PBCH) so as to avoid an additional delay and/or complexity associated with including the offset information in a physical downlink shared channel (PDSCH), which requires decoding of a physical downlink control channel associated with the PDSCH. In some cases, a set of beginning locations of the RACH window may be down-selected (e.g., quantized) to reduce a number of bits needed to carry the information in the L1 channel. In some cases, the base station 505 may continue to transmit the burst of beam reference signals 535 to reduce an offset (e.g., fill in the offset) between the last transmission of the burst and a first transmission opportunity for RACH in order help the UE 510 to detect the transmission of the burst 720.

The beam discovery window 705 may include a plurality of start locations 740 for the RACH window 730. A start location 740 may refer to a transmission opportunity 710 that has been preconfigured to be the beginning of the RACH window 730. The start locations 740 may not be utilized to be the beginning of a RACH window 730 until after the burst 720 of directional beam reference signals 725 has been transmitted. The beam discovery window 705 may be configured with any number of start locations 740 in any transmission opportunity 710. The start locations 740 are shown by way of example only. In some examples, the start locations 740 of the beam discovery window 705 may be configured in a periodic pattern. In some examples, the start locations 740 of the beam discovery window 705 may be configured in an aperiodic pattern. In some examples, every transmission opportunity 710 of the beam discovery window 705 may serve as a start location 740.

Upon determining that communication resources are available (e.g., the LBT procedure is successful at 715), the base station 505 may generate and transmit the burst 720 of directional beam reference signals. The base station 505 may also determine a start time of the RACH window 730 in response to the LBT procedure being successful at 715. The base station 505 may identify a start time of the burst 720 and a length of the burst 720. Using this information, the base station 505 may identify the first available start location 740 after the last transmission of the burst 720. The base station 505 may configure the RACH window 730 to begin during this first available start location 740 and communicate such information to the UE 510.

In some cases, there will be unused transmission opportunities (e.g., unused communication resources) between the last transmission of the burst 720 of directional beam reference signals 725 and the first RACH transmission opportunity 755 of a RACH window 730. In some examples, the base station 505 may transmit additional signals 745 during these unused transmission opportunities. The additional signals 745 may be additional directional beam discovery signals 750 (i.e., more beam discovery signals than are part of a typical burst 720). The additional signals 745 may be examples of other types of signals such as control signals or other data signals or communications to other connected UEs. In some examples, the unused transmission opportunities may go unused and the base station 505 and the UE 510 may stay silent during this time.

If at least a portion of the RACH window 730 occurs during the beam discovery window 705, one or more transmission opportunities 710 may be repurposed as RACH transmission opportunities 755. During a RACH transmission opportunity 755, the base station 505 listens in particular directions for RACH signals 735 and refrains from communicating using those communication resources used for listening. During a RACH transmission opportunity 755, the UE 510 may transmit a RACH signal 735. In some cases, the UE 510 may determine characteristics of the RACH signal based on information obtained from received and/or decoded directional beam reference signals 725, 750.

Figure 8:
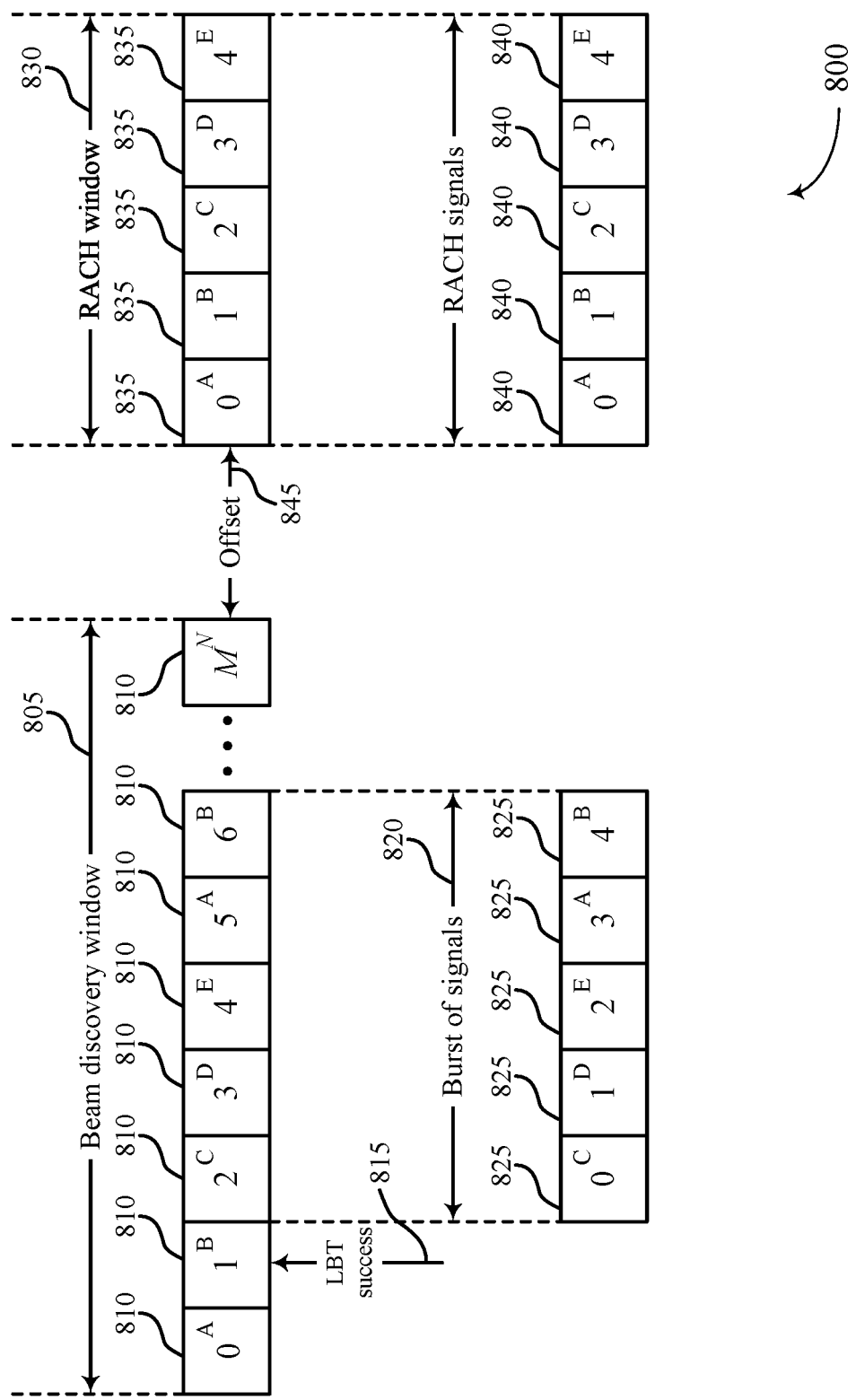
FIG. 8 illustrates an example of a procedure structure that supports RACH window design in mmW shared spectrum in accordance with one or more aspects of the present disclosure.

FIG. 8 illustrates an example of a procedure structure 800 that supports RACH window design in mmW shared spectrum in accordance with various aspects of the present disclosure. In some examples, the procedure structure 800 may implement aspects of the wireless communication systems 100 or 200. The procedure structure 800 may be another example of the dynamic communication scheme 500 described with reference to FIG. 5. As such, the procedure structure 800 includes many of the same features as the communication scheme 500 and the procedure structure 600 described with reference to FIGS. 5-6 and full descriptions of those elements are not repeated here. The procedure structure 800 illustrates a different method of determining the timing of a RACH window 730 based on the transmission of the burst 720 of directional beam reference signals 725.

In the procedure structure 800, the RACH window 830 may be positioned after the beam discovery window 805. The example of the procedure structure 800 illustrates how the timing of the RACH window 830 may be based on the beam discovery window 805 rather than the transmission of the burst 820 of directional beam reference signals 825. In the procedure structure 800, however, the occurrence of the RACH window 830 and/or the execution of a RACH procedure is triggered by a successful LBT procedure (at 815) and/or the transmission of the burst 820. As such, the UE 510 may need to know whether the base station 505 has performed a successful LBT procedure or not. The UE 510 may use its detection of the transmission of the burst 820 as a trigger for the RACH procedure. For example, a transmission of the beam discovery window 805 (e.g., a DMTC window) may be conditioned on passing of an LBT procedure. That is, when the LBT procedure fails, the base station 505 generally does not transmit the burst 820, and thus, may not be able to receive the RACH transmissions reliably. As such, the RACH window may be conditioned on passing of the LBT procedure for transmitting the DMTC window, and the base station 505 may transmit a signal (e.g., a cell specific reference signal (CRS)) indicating the passing of the LBT procedure to the UE 510. In some cases involving the NR, such signaling mechanism (e.g., CRS) may not be available. As such, a triggering mechanism for the RACH procedure may be useful in these cases involving the NR. A trigger for the RACH procedure may include a detection of the burst 820 by the UE 510. For example, if the UE 510 detects the transmission of the burst 820, the UE 510 may infer that the base station 505 has passed the LBT procedure for the DMTC, and thus, the base station 505 may then reliably pick up the RACH transmissions from the UE 510. Thus, if the UE 510 does not detect the transmission of the burst 820 in the beam discovery window 805, the UE 510 may not use any RACH opportunity that may be associated with the beam discovery window 805. In some cases, the base station 505 may provide, together with the burst 820, an offset information between a last transmission opportunity of the burst 820 and a first transmission opportunity of the RACH window in PBCH or a separate L1 channel. In such case, when the UE 510 detects the transmission of the burst 820, the UE 510 may also know the offset information, and thus, where the RACH opportunities are.

In some examples, an offset 845 exists between the last transmission opportunity 810 of the beam discovery window and the first transmission opportunity 835 of the RACH window 830. The offset 845 may be configured to give the UE 510 time to analyze the burst 820 of directional beam reference signals 825 and beam direction information to use during the RACH procedure. In some examples, the offset 845 may be zero, where the RACH window 830 starts immediately after the last transmission opportunity 810 of the beam discovery window 805. In some examples, the base station 505 may use communication resources that are associated with the offset 845 to transmit additional directional beam reference signals 825 after the beam discovery window 805 is complete.

In the procedure structure 800, the base station 505 may not repurpose one or more of the transmission opportunities 810 as RACH transmission opportunities 835. Because the RACH window 830 does not overlap with the beam discovery window 805, such repurposing may not be necessary. During one or more of the RACH transmission opportunities 835, the UE 510 may transmit one or more RACH signals 840.

Figure 9:
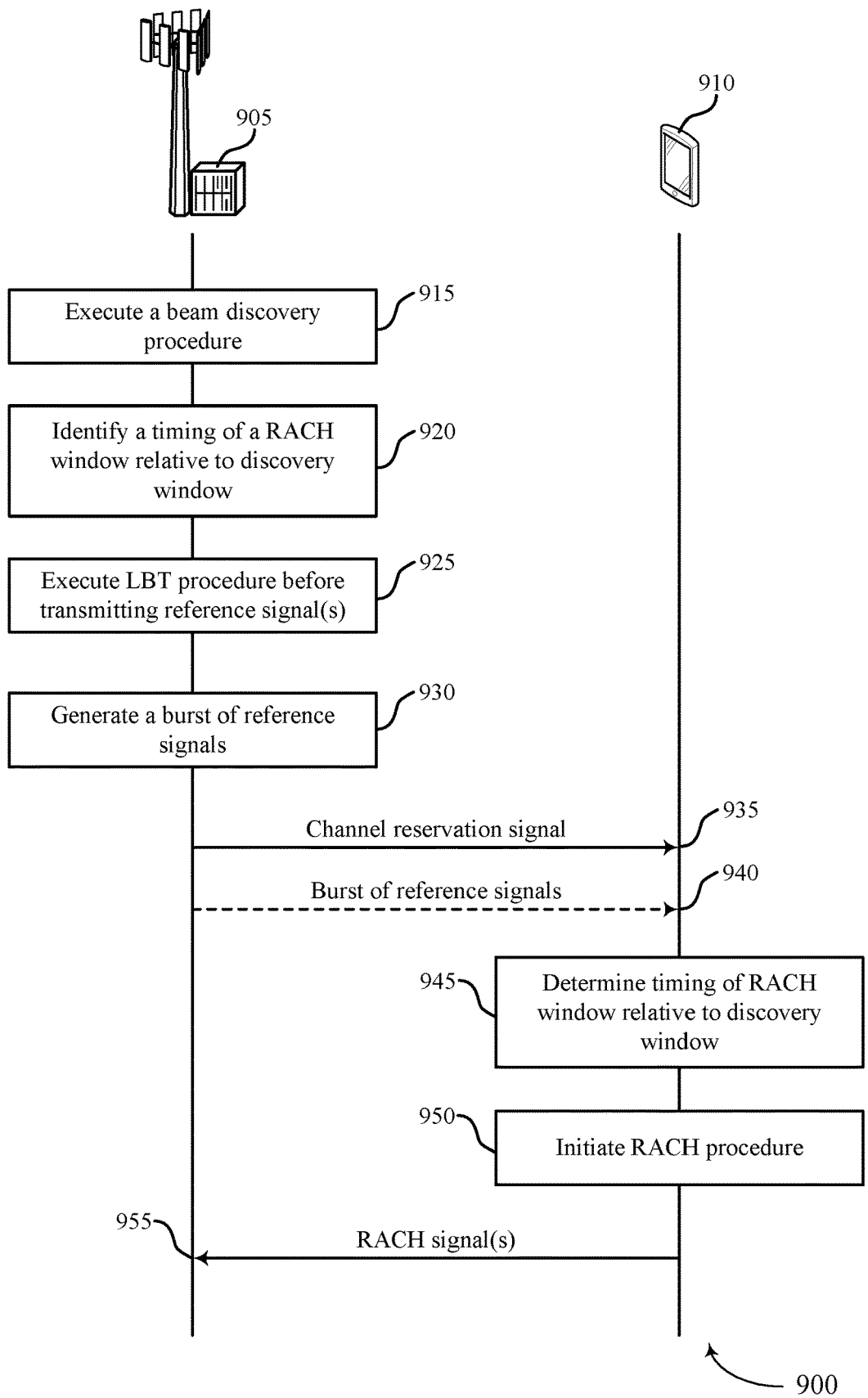
FIG. 9 illustrates an example of a communication scheme that supports RACH window design in mmW shared spectrum in accordance with one or more aspects of the present disclosure.

FIG. 9 illustrates an example of a communication scheme 900 that supports RACH window design in mmW shared spectrum in accordance with various aspects of the present disclosure. In some examples, the communication scheme 900 may implement aspects of the wireless communication systems 100 or 200. The communication scheme 900 illustrates a static configuration for a RACH window relative to a beam discovery window. In such a static configuration, a RACH procedure may be initiated regardless of the outcome of an LBT procedure, a beam discovery procedure, a transmission of directional beam discovery signals, or a reception/successful decoding of directional beam discovery signals. In some cases, the execution of a beam discovery procedure by the base station 905 is accompanied with the execution of a RACH procedure by the base station 905. The base station 905 may be an example of the base stations 105, 205, 505 described with reference to FIGS. 1-2 and 5-8. The UE 910 may be an example of the UEs 115, 210, 510 described with reference to FIGS. 1-2 and 5-8.

At 915, the base station 905 may execute a beam discovery procedure. The base station 905 may determine one or more characteristics of a beam discovery window such as the length of the beam discovery window, the number of unique beam directions, a mapping of beam directions to discovery windows, the size of a transmission opportunity (slot, sub-frame, resource block, duration of time, etc.), other characteristics, or combinations thereof.

At 920, the base station 905 identify a timing of a RACH window relative to the beam discovery window. In a static configuration, a RACH procedure is triggered by the execution of the beam discovery procedure, rather than being triggered by an LBT procedure being successful or the transmission/reception of directional beam reference signals 940. As such, the base station 905 may determine one or more characteristics of the RACH procedure and/or RACH window relative to the beam discovery window and/or a beam discovery procedure based on the beam discovery procedure being executed. The characteristics of the RACH procedure and/or the RACH window may include the start time of the RACH window, the number of transmission opportunities in the RACH window, the mapping of beam directions to transmission opportunities, an offset between the end of the burst of directional beam reference signals 940 and the beginning of the RACH window, other characteristics, or combinations thereof.

At 925, the base station 905 may execute an LBT procedure before transmitting one or more directional beam reference signals 940. The base station 905 may use the LBT procedure to determine whether communication resources are available for use by the base station 905 in a shared radio frequency spectrum. In some examples, the base station 905 may use other types of procedures to determine whether communication resources are available in a contention-based RAT.

At 930, if the LBT procedure is successful, the base station 905 may generate a burst of directional beam reference signals 940. The base station 905 may determine one or more characteristics of a burst of directional beam reference signals 940. Such characteristics may include, the number of signals to be transmitted in a burst, the number of beam direction cycles to be transmitted in a burst, an offset of transmission opportunities between the LBT procedure being successful and the first transmission, other characteristics, or combinations thereof. The base station 905 may transmit the burst of directional beam reference signals 940.

The base station 905 may also transmit and/or broadcast a channel reservation signal 935 based on the LBT procedure being successful. In the static configurations, the channel reservation signal 935 may indicate to one or more other UEs and/or one or more other base stations communication resources to be used by the base station 905 for the burst of directional beam reference signals 940 and/or the RACH procedure. In some cases a single common channel reservation signal may be used to reserve communication resources for both the burst of directional beam reference signals 940 and the transmission opportunities of a RACH window during which one or more RACH signals 955 may be transmitted as part of a RACH procedure.

At 945, the UE 910 may determine the timing of the RACH window and/or other characteristics about the RACH procedure and/or the RACH window relative to the beam discovery window. In a static configuration, the UE 910 may initiate a RACH procedure periodically based on a predetermined calendar. In some cases, the UE 910 may initiate a RACH procedure based on RACH window signaling received from the base station 905 in response to executing the beam discovery procedure. The UE 910 may determine one or more characteristics about the RACH procedure and/or the RACH window. For example, the UE 910 may determine the start time of the RACH window, the number of transmission opportunities in the RACH window, the mapping of beam directions to transmission opportunities, an offset between the end of the burst of directional beam reference signals 940 and the beginning of the RACH window, other characteristics, or combinations thereof. In some examples, information regarding the RACH window and/or RACH procedure may be communicated using a PBCH of the directional beam discovery signal. In some examples, the index value associated with the decoded directional beam reference signal may indicate information about the RACH procedure and/or RACH window. In some examples, L1 signaling may indicate information about the RACH procedure and/or RACH window. In some cases, the UE 910 may determine a timing of a RACH window based on information included in the channel reservation signal 935.

At 950, the UE 910 may initiate a RACH procedure during the RACH window. The RACH procedure may include some of the features discussed with reference to FIG. 4. For example, the UE 910 may transmit RACH signals 955 in all of the transmission opportunities of the RACH window. In some examples, the UE 910 may identify one or more beam indexes based on receiving the directional beam reference signals 940.

Figure 10:
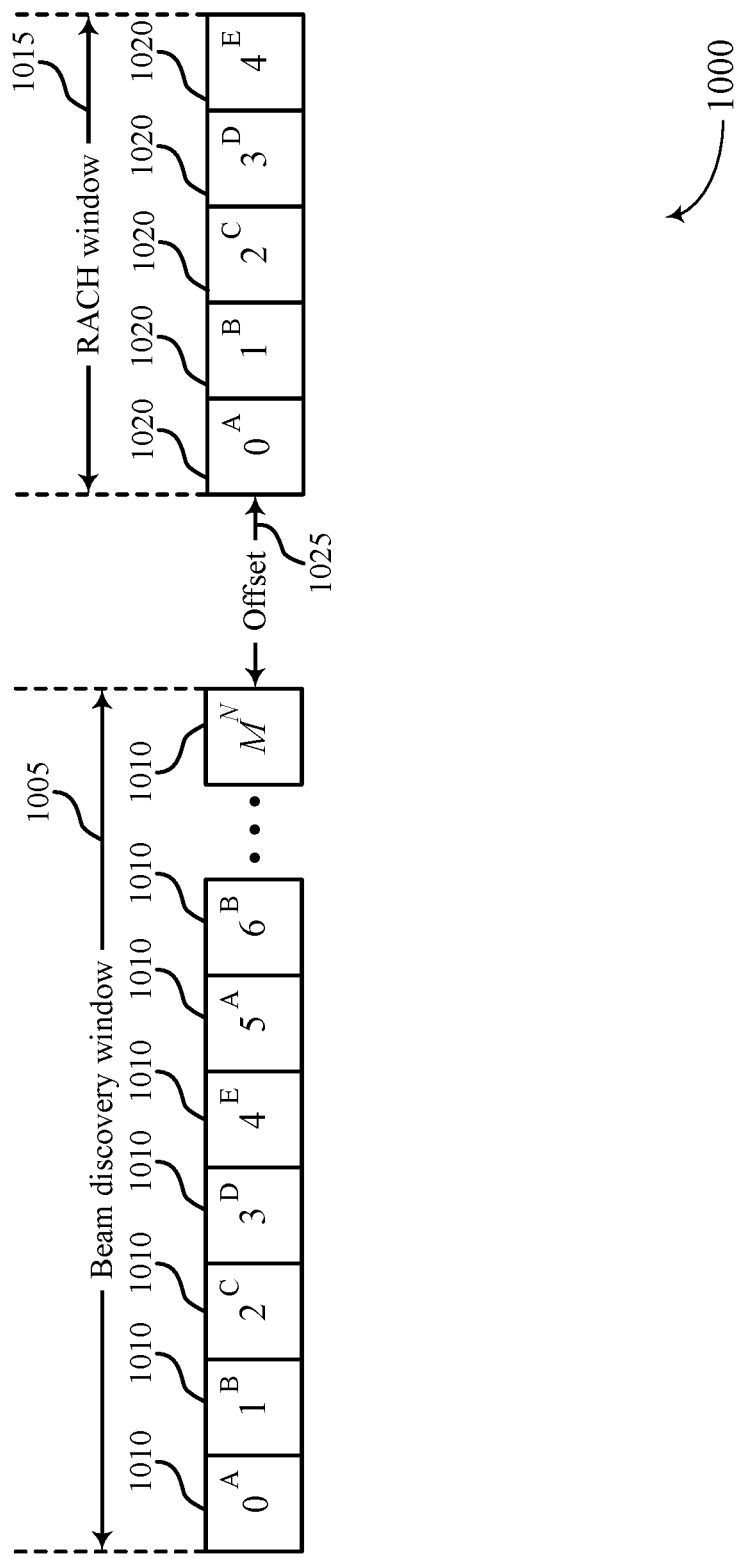
FIG. 10 illustrates an example of a procedure structure that supports RACH window design in mmW shared spectrum in accordance with one or more aspects of the present disclosure.

FIG. 10 illustrates an example of a procedure structure 1000 that supports RACH window design in mmW shared spectrum in accordance with various aspects of the present disclosure. In some examples, the procedure structure 1000 may implement aspects of the wireless communication systems 100 or 200. The procedure structure 1000 may be another example of the static communication scheme 900 described with reference to FIG. 9.

The procedure structure 1000 may illustrate a static configuration for a RACH window 1015 that occurs after a beam discovery window 1005. The timing of the RACH window 1015 may be determined based on the timing of the beam discovery window 1005. In some cases, the timing of the RACH window 1015 may be configured to be in a fixed position relative to the beam discovery window 1005. In some static configurations, the RACH window 1015 may be configured based on the beam discovery window 1005 being configured. In some static configuration, the RACH window 1015 may be configured regardless of whether an LBT procedure is successful or whether one or more directional beam discovery signals are transmitted or received.

The beam discovery window 1005 may be an example of the discovery windows 230, 305 described with reference to FIGS. 2-5. The transmission opportunities 1010 may be an example of the transmission opportunities 310 described with reference to FIGS. 3-5. The RACH window 1015 may be an example of the RACH windows 235, 405 described with reference to FIGS. 2-5. The RACH transmission opportunities 1020 may be examples of the RACH transmission opportunities 410 described with reference to FIGS. 4-5.

The procedure structure 1000 may be an example of the procedure structure 800 described with reference to FIG. 8, except that the procedure structure 1000 is implemented in a static configuration rather than a dynamic configuration. In some examples, an offset 1025 exists between the last transmission opportunity 1010 of the beam discovery window 1005 and the first RACH transmission opportunity 1020 of the RACH window 1015. The offset 1025 may be configured to give the UE 910 time to analyze a burst of directional beam reference signals and beam direction information to use during the RACH procedure. In some examples, the offset 1025 may be zero, where the RACH window 1015 starts immediately after the last transmission opportunity 1010 of the beam discovery window 1005. In some examples, the base station 905 may use communication resources that are associated with the offset 1025 to transmit additional directional beam discovery signals after the beam discovery window 1005 is complete.

In the procedure structure 1000, the base station 905 may not repurpose one or more of the transmission opportunities 1010 as RACH transmission opportunities 1020. Because the RACH window 1015 does not overlap with the beam discovery window 1005, such repurposing may not be necessary. During one or more of the RACH transmission opportunities 1020, the UE 910 may transmit one or more RACH signals.

Figure 11:
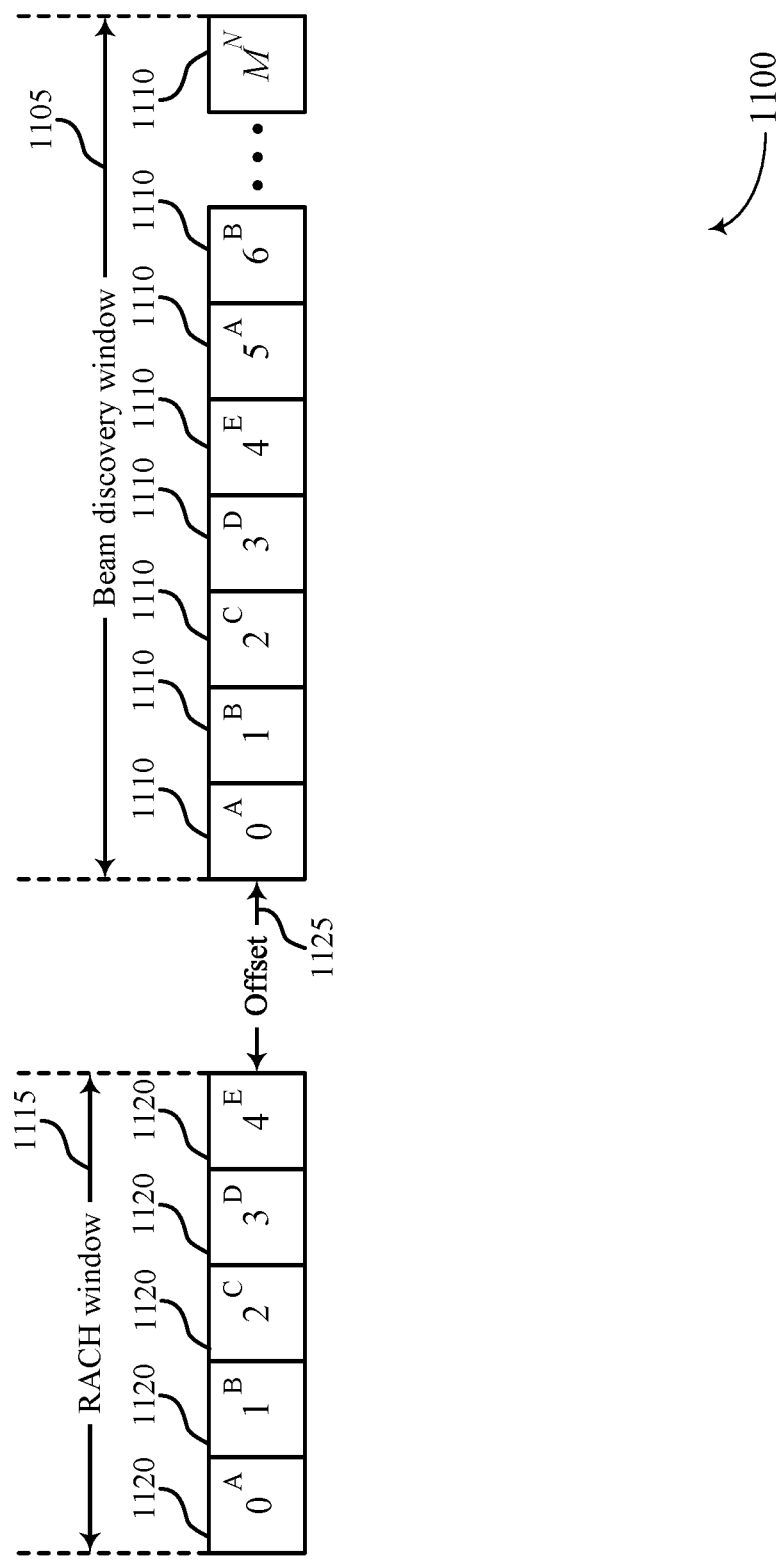
FIG. 11 illustrates an example of a procedure structure that supports RACH window design in mmW shared spectrum in accordance with one or more aspects of the present disclosure.

FIG. 11 illustrates an example of a procedure structure 1100 that supports RACH window design in mmW shared spectrum in accordance with various aspects of the present disclosure. In some examples, the procedure structure 1100 may implement aspects of the wireless communication systems 100 or 200. The procedure structure 1100 may be another example of the static communication scheme 900 described with reference to FIG. 9. As such, the procedure structure 1100 includes many of the same features as the communication scheme 900 and the procedure structure 1000 described with reference to FIGS. 9-10 and full descriptions of those elements are not repeated here.

The procedure structure 1100 may illustrate a static configuration for a RACH window 1115 that occurs before a beam discovery window 1105. The timing of the RACH window 1115 may be determined based on the timing of the beam discovery window 1105. In some cases, the timing of the RACH window 1115 may be configured to be in a fixed position relative to the beam discovery window 1105. In some static configurations, the RACH window 1115 may be configured based on the beam discovery window 1105 being configured. In some static configuration, the RACH window 1115 may be configured regardless of whether an LBT procedure is successful or whether one or more directional beam discovery signals are transmitted or received.

In some examples, an offset 1125 exists between the last RACH transmission opportunity 1120 of the RACH window 1115 and the first transmission opportunity 1010 of the beam discovery window 1110. In some examples, the offset 1125 may be zero, where the beam discovery window 1105 starts immediately after the last RACH transmission opportunity 1120 of the RACH window 1115. In some examples, the base station 905 may use communication resources that are associated with the offset 1125 to transmit additional directional beam discovery signals.

In the procedure structure 1100, the base station 905 may not repurpose one or more of the transmission opportunities 1110 as RACH transmission opportunities 1120. Because the RACH window 1115 does not overlap with the beam discovery window 1105, such repurposing may not be necessary. During one or more of the RACH transmission opportunities 1120, the UE 910 may transmit one or more RACH signals.

Figure 12:
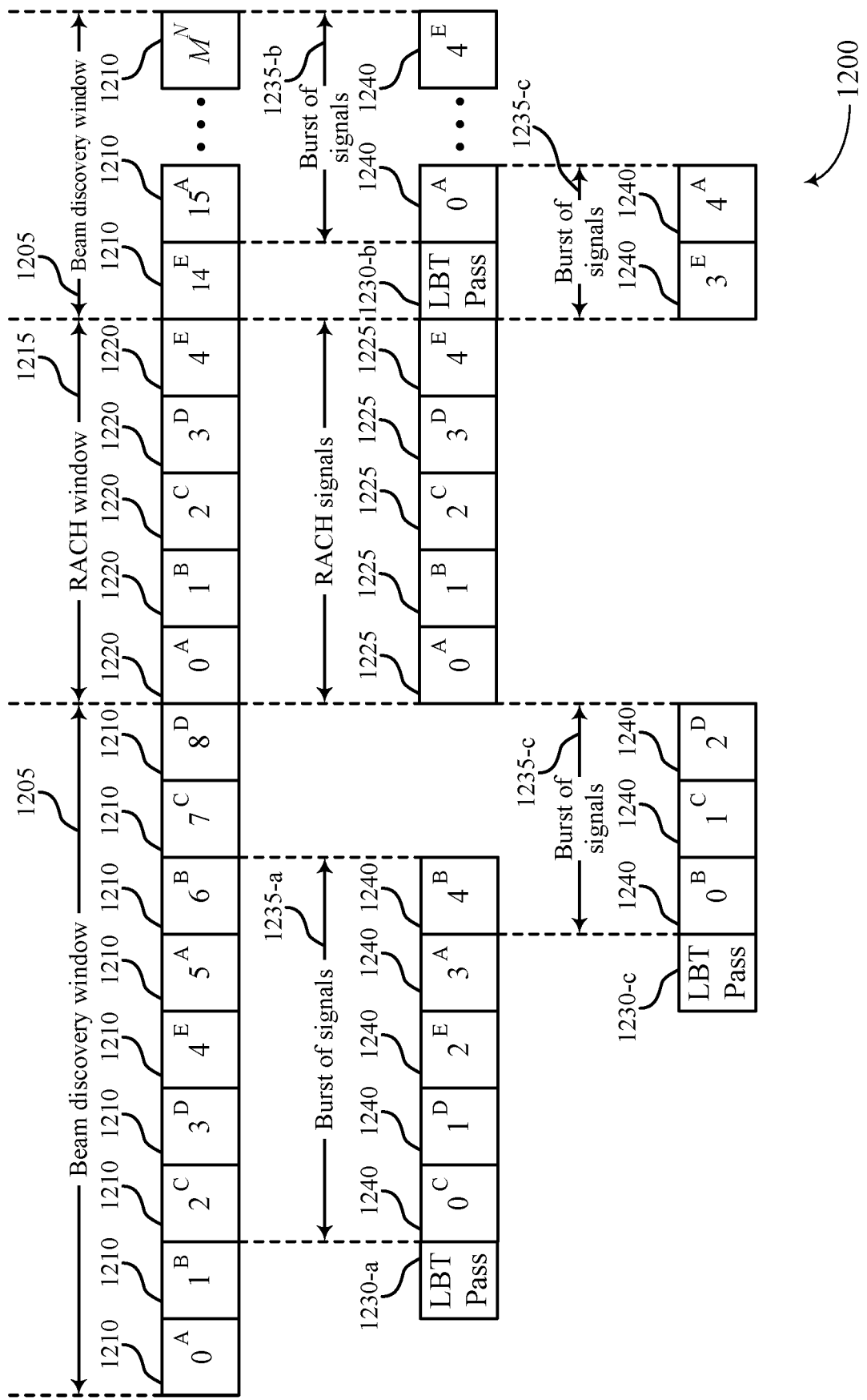
FIG. 12 illustrates an example of a procedure structure that supports RACH window design in mmW shared spectrum in accordance with one or more aspects of the present disclosure.

FIG. 12 illustrates an example of a procedure structure 1200 that supports RACH window design in mmW shared spectrum in accordance with various aspects of the present disclosure. In some examples, the procedure structure 1200 may implement aspects of the wireless communication systems 100 or 200. The procedure structure 1200 may be another example of the static communication scheme 900 described with reference to FIG. 9. As such, the procedure structure 1200 includes many of the same features as the communication scheme 900 and the procedure structure 1000 described with reference to FIGS. 9-10 and full descriptions of those elements are not repeated here.

The procedure structure 1200 may illustrate a static configuration for a RACH window 1215 that occurs during a beam discovery window 1205. In such examples, the resources of the beam discovery window 1205 may be punctured to make room for the RACH window 1215. The timing of the RACH window 1215 may be determined based on the timing of the beam discovery window 1205. In some cases, the timing of the RACH window 1215 may be configured to be in a fixed position relative to the beam discovery window 1205. In some static configurations, the RACH window 1215 may be configured based on the beam discovery window 1205 being configured. In some static configuration, the RACH window 1215 may be configured regardless of whether an LBT procedure is successful or whether one or more directional beam discovery signals are transmitted or received.

When the RACH window 1215 is positioned in the middle of the beam discovery window 1205 in a static configuration, a number of possible scenarios may occur. For example, the transmission of a burst 1235 of directional beam reference signals 1240 may occur before the RACH window 1215, after the RACH window, or the burst 1235 of transmissions may be interrupted by the RACH window 1215 such that a first of the directional beam reference signals 1240 are transmitted before the RACH window 1215 and a second set of the directional beam reference signals 1240 are transmitted after the RACH window 1215. When a base station 905 reaches the RACH window 1215, the base station 905 may cease attempting to transmit directional beam reference signals 1240, and instead listen for RACH signals during the RACH transmission opportunities 1220. In some examples, the total number of transmission opportunities 1210 in the beam discovery window 1205 is not reduced as compared to other similar configurations. In some examples, the total number of transmission opportunities 1210 in the beam discovery window 1205 is reduced by the number of RACH transmission opportunities 1220 positioned in the midst of the beam discovery window 1205.

In a first scenario, an LBT procedure 1230-*a* is successful such that there are enough transmission opportunities 1210 between the LBT procedure 1230-*a* that is successful and the RACH window 1215 for the burst 1235-*a* of signals to be transmitted. After the LBT is successful, the base station 905 may determine whether there are enough transmission opportunities 1210 before the RACH window 1215 to transmit the entire burst 1235-*a*. The base station 905 may configure the burst 1235-*a* based on this information. In some cases, the base station 905 may transmit directional beam reference signals 1240 until the RACH window begins 1215, after the LBT procedure 1230-*a* is successful.

In a second scenario, an LBT procedure 1230-*b* is successful after the RACH window 1215 is complete. In some cases, the base station 905 may transmit an entire burst 1235-*b* of directional beam reference signals 1240 using some or all of the remaining RACH transmission opportunities 1220. In some cases, there may not be enough remaining transmission opportunities 1210 to transmit the entire burst 1235-*b*. In such cases, the base station 905 may truncate the burst 1235-*b* and may transmit only a portion of the burst 1235-*b*. In some cases, the base station 905 may transmit the burst 1235-*b* using other transmission opportunities that occur after the beam discovery window 1205.

In a third scenario, the LBT procedure 1230-*c* is successful, but there is not enough transmission opportunities 1210 to transmit an entire burst 1235-*c* before the RACH window 1215 begins. The base station 905 may identify a number of transmission opportunities 1210 that occur before the beginning of the RACH window 1215. The base station 905 may divide the burst 1235-*c* into a first portion and a second portion. The base station 905 may transmit the first portion before the RACH window 1215 and the second portion after the RACH window 1215. If the LBT procedure 1230-*c* is successful right before the RACH window 1215 begins, the base station 905 may be configured to transmit the entire burst 1235-*c* after the RACH window 1215 is complete.

In some cases, if the LBT procedure has not indicated that communication resources are available before the RACH window starts, in a variation of the third scenario, the LBT procedure may be successful during the RACH window. In such a situation, the base station 905 may be configured to transmit the burst of directional beam discovery signals after the RACH window 1215 is complete.

During the RACH window 1215, the UE 910 may transmit one or more RACH signals 1225. The RACH signals 1225 may be examples of RACH signals 415, 550, 635, 735, 840 described with reference to FIGS. 4-8.

Figure 13:
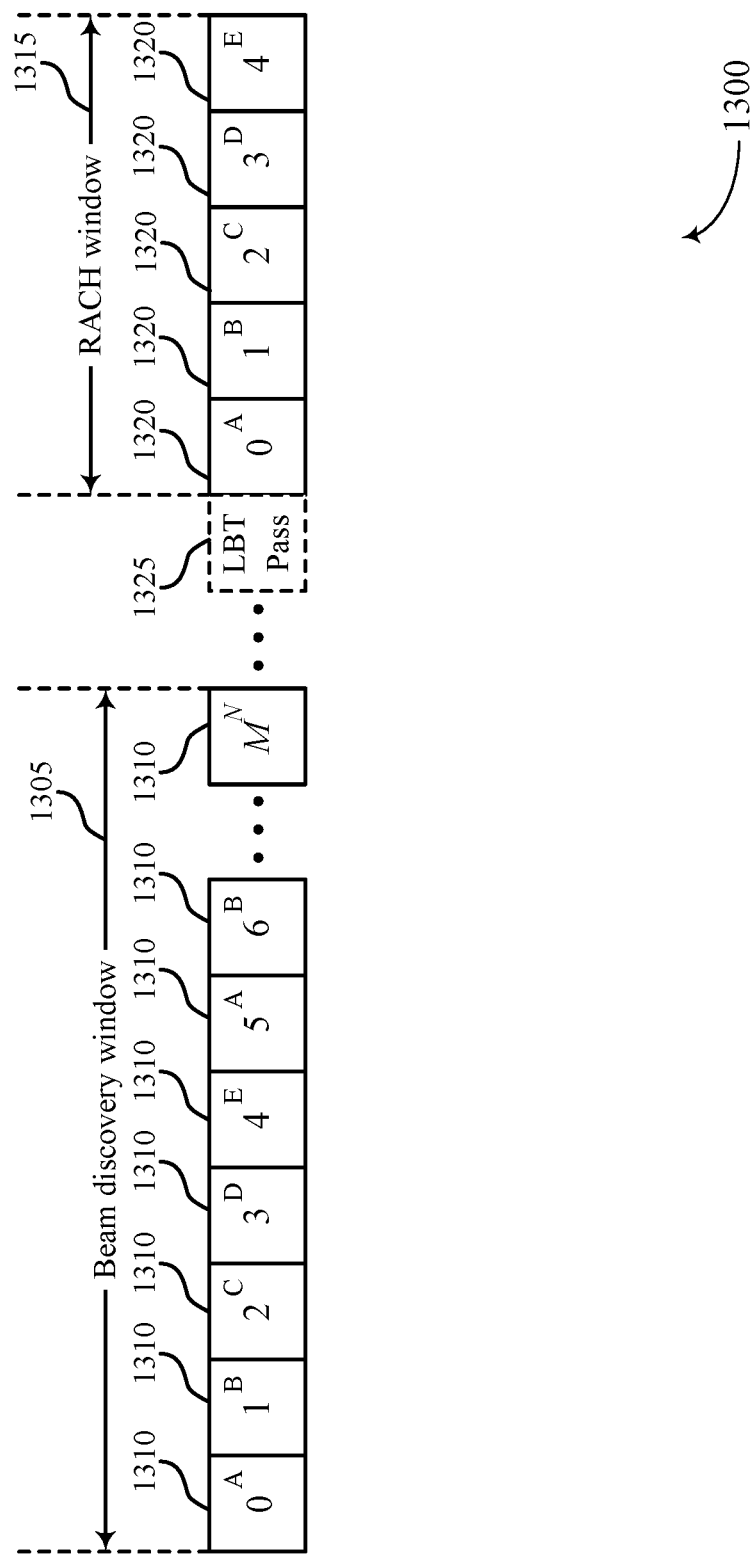
FIG. 13 illustrates an example of a procedure structure that supports RACH window design in mmW shared spectrum in accordance with one or more aspects of the present disclosure.

FIG. 13 illustrates an example of a procedure structure 1300 that supports RACH window design in mmW shared spectrum in accordance with various aspects of the present disclosure. In some examples, the procedure structure 1300 may implement aspects of the wireless communication systems 100 or 200.

The procedure structure 1300 may illustrate a configuration for a RACH window 1315 where the RACH window 1315 is independently configured from the beam discovery window 1305. In some examples, an LBT procedure 1325 may be performed before the RACH window 1315 either by a base station or a UE. When the RACH window 1315 is configured independently, the position of the RACH window 1315 is not related to the position of the beam discovery window 1305. As such, the RACH window 1315 may be positioned before, during, or after the beam discovery window 1305. The beam discovery window 1305 may include a number of transmission opportunities 1310. The RACH window 1315 may include a number of RACH transmission opportunities 1320. In the procedure structure 1300 the RMSI may configure where the RACH window is. In some cases, a channel reservation signal separate from the channel reservation signal associated with the beam discovery procedure is used to protect reception during the RACH window 1315.

Figure 14:
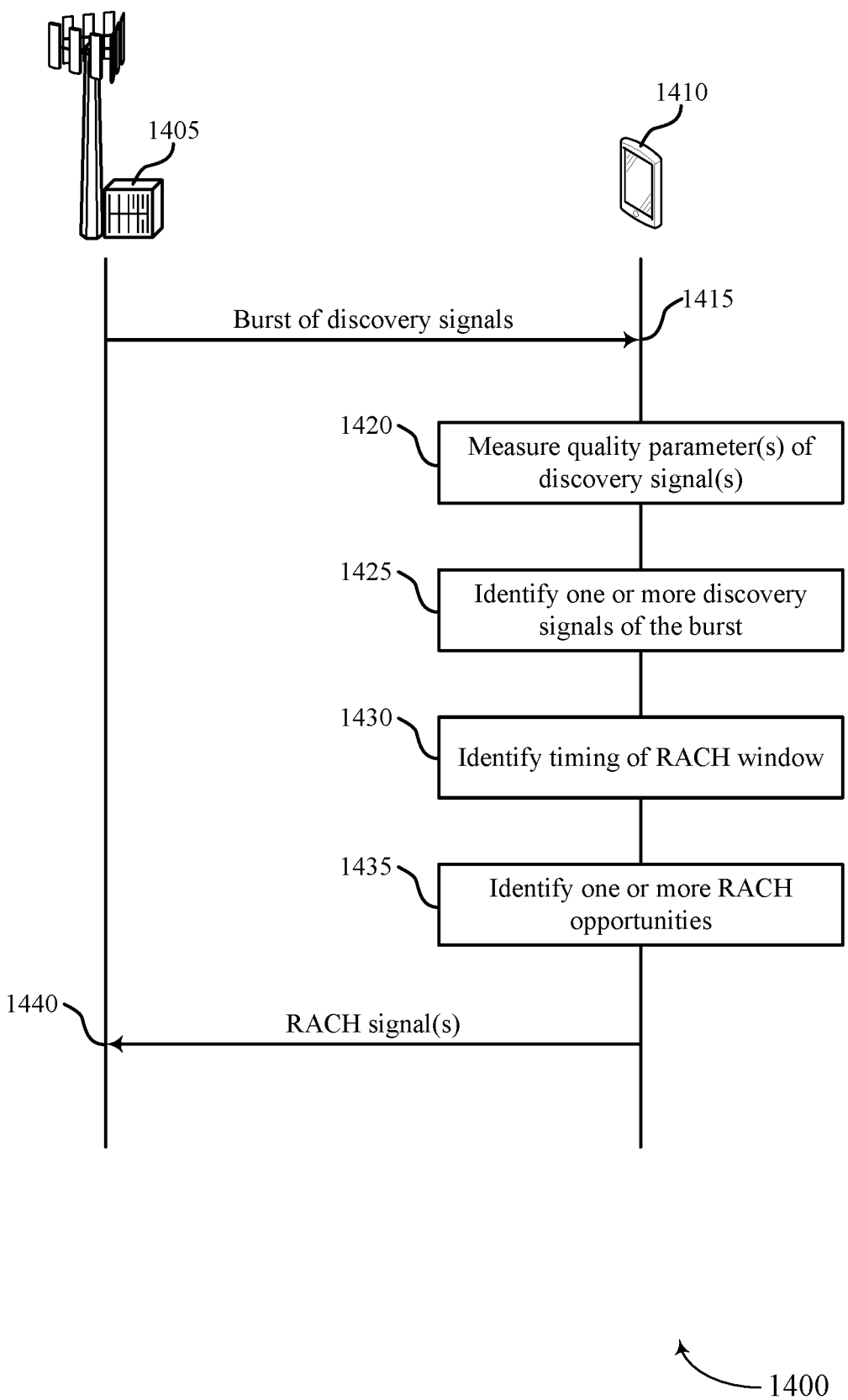
FIG. 14 illustrates an example of a communication scheme that supports RACH window design in mmW shared spectrum in accordance with one or more aspects of the present disclosure.

FIG. 14 illustrates an example of a communication scheme 1400 that supports RACH window design in mmW shared spectrum in accordance with various aspects of the present disclosure. In some examples, the communication scheme 1400 may implement aspects of the wireless communication systems 100 or 200. The communication scheme 1400 may illustrate how a UE 1410 may use information recovered from directional beam discovery signals 1415 received from a base station 1405 to improve the performance a RACH procedure. The base station 1405 may be an example of the base stations 105, 205, 505, 905 described with reference to FIGS. 1-13. The UE 1410 may be an example of the UEs 115, 210, 510, 910 described with reference to FIGS. 1-13.

At 1420, the UE 1410 may measure one or more quality parameters of one or more directional beam discovery signals 1415 received from a base station 1405 during a beam discovery procedure. The one or more quality parameters may include a signal strength, a signal-to-noise ratio, a power level of the signal, other parameters, or combinations thereof.

At 1425, the UE 1410 may identify one or more directional beam discovery signals based on the measured quality parameters. In some cases, the UE 1410 may determine one directional beam discovery signal that was the best. The UE 1410 may be configured to use this information to determine a relative location of the base station 1405.

At 1430, the UE 1410 may identify the timing of the RACH window. The UE 1410 may identify beam directions of the base station 1405 associated with each RACH transmission opportunity in the RACH window. During a RACH procedure, the base station 1405 may be configured to listen in specific directions.

At 1435, the UE 1410 may identify one or more RACH transmission opportunities of the RACH window that are associated with the identified one or more directional beam discovery signals. The UE 1410 may be configured to transmit a RACH signal 1440 in each of the identified RACH transmission opportunities.

Figure 15:
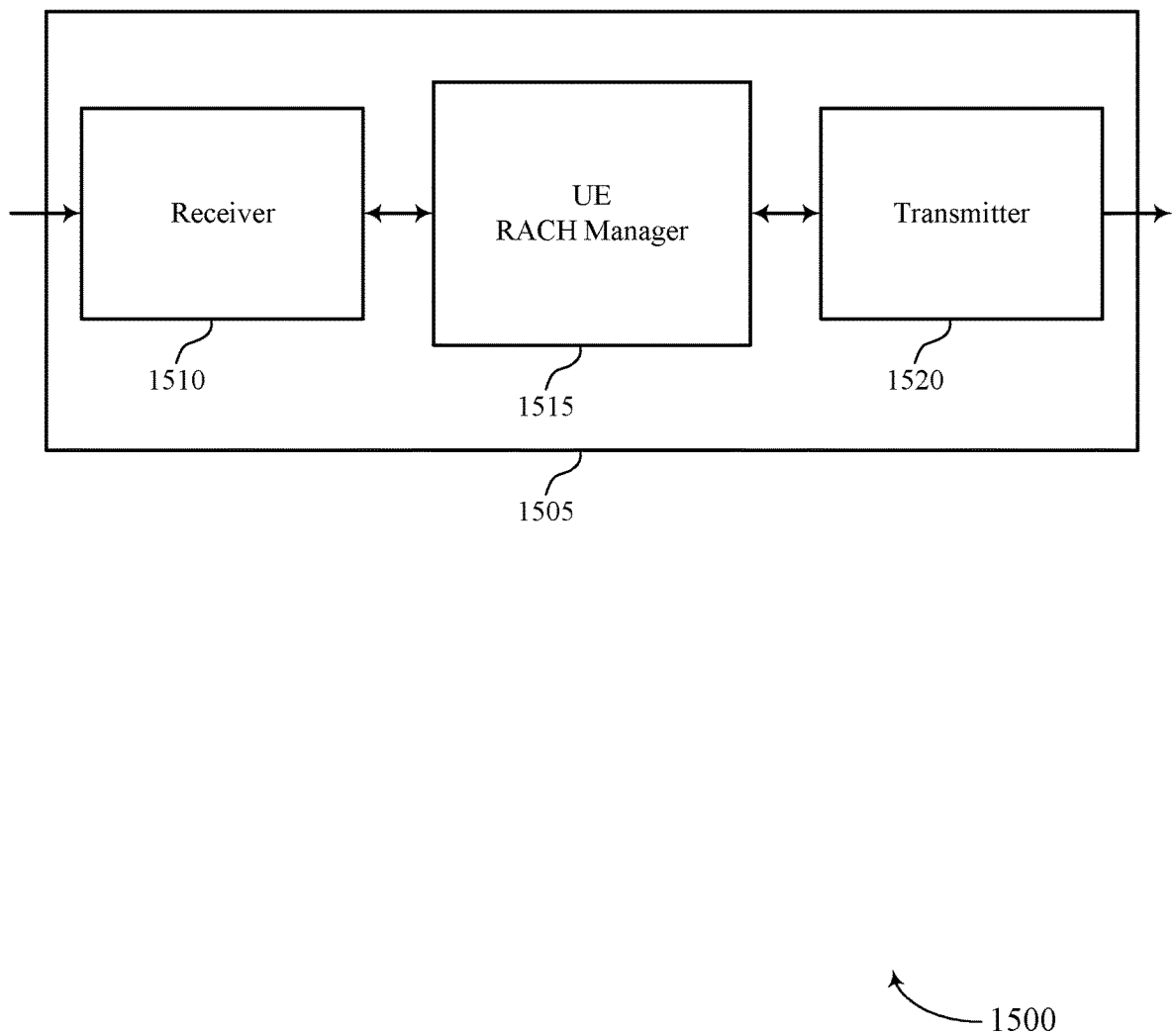
FIGS. 15 through 17 show block diagrams of a device that supports RACH window design in mmW shared spectrum in accordance with one or more aspects of the present disclosure.

FIG. 15 shows a block diagram 1500 of a wireless device 1505 that supports RACH window design in mmW shared spectrum in accordance with one or more aspects of the present disclosure. Wireless device 1505 may be an example of aspects of a UE 115 as described herein. Wireless device 1505 may include receiver 1510, UE RACH manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to RACH window design in mmW shared spectrum, etc.). Information may be passed on to other components of the device. Receiver 1510 may be an example of aspects of transceiver 1835 described with reference to FIG. 18. The receiver 1510 may utilize a single antenna or a set of antennas. Receiver 1510 may receive a directional beam discovery signal transmitted during a beam discovery window using a shared frequency spectrum band.

UE RACH manager 1515 may be an example of aspects of the UE RACH manager 1815 described with reference to FIG. 18. UE RACH manager 1515 and/or at least some of its various sub-components may be implemented in hardware, software executed by a processor, firmware, or any combination thereof. If implemented in software executed by a processor, the functions of UE RACH manager 1515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. UE RACH manager 1515 and/or at least some of its various sub-components may be physically located at various positions, including being distributed such that portions of functions are implemented at different physical locations by one or more physical devices. In some examples, UE RACH manager 1515 and/or at least some of its various sub-components may be a separate and distinct component in accordance with various aspects of the present disclosure. In other examples, UE RACH manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE RACH manager 1515 may initiate a RACH procedure during a RACH window, where a timing of the RACH window is based on receiving the directional beam discovery signal and transmit a directional RACH signal during the RACH window. UE RACH manager 1515 may also identify a beam discovery window and a timing of a RACH window relative to the beam discovery window in a shared frequency spectrum band based on a single control signal received from a base station, where the RACH window is located in a fixed position relative to the beam discovery window, receive a burst of directional beam discovery signals transmitted during the beam discovery window, and transmit a directional RACH signal during the RACH window.

Transmitter 1520 may transmit signals generated by other components of the device. In some examples, the transmitter 1520 may be collocated with a receiver 1510 in a transceiver module. For example, transmitter 1520 may be an example of aspects of the transceiver 1835 described with reference to FIG. 18. Transmitter 1520 may utilize a single antenna or a set of antennas.

Figure 16:
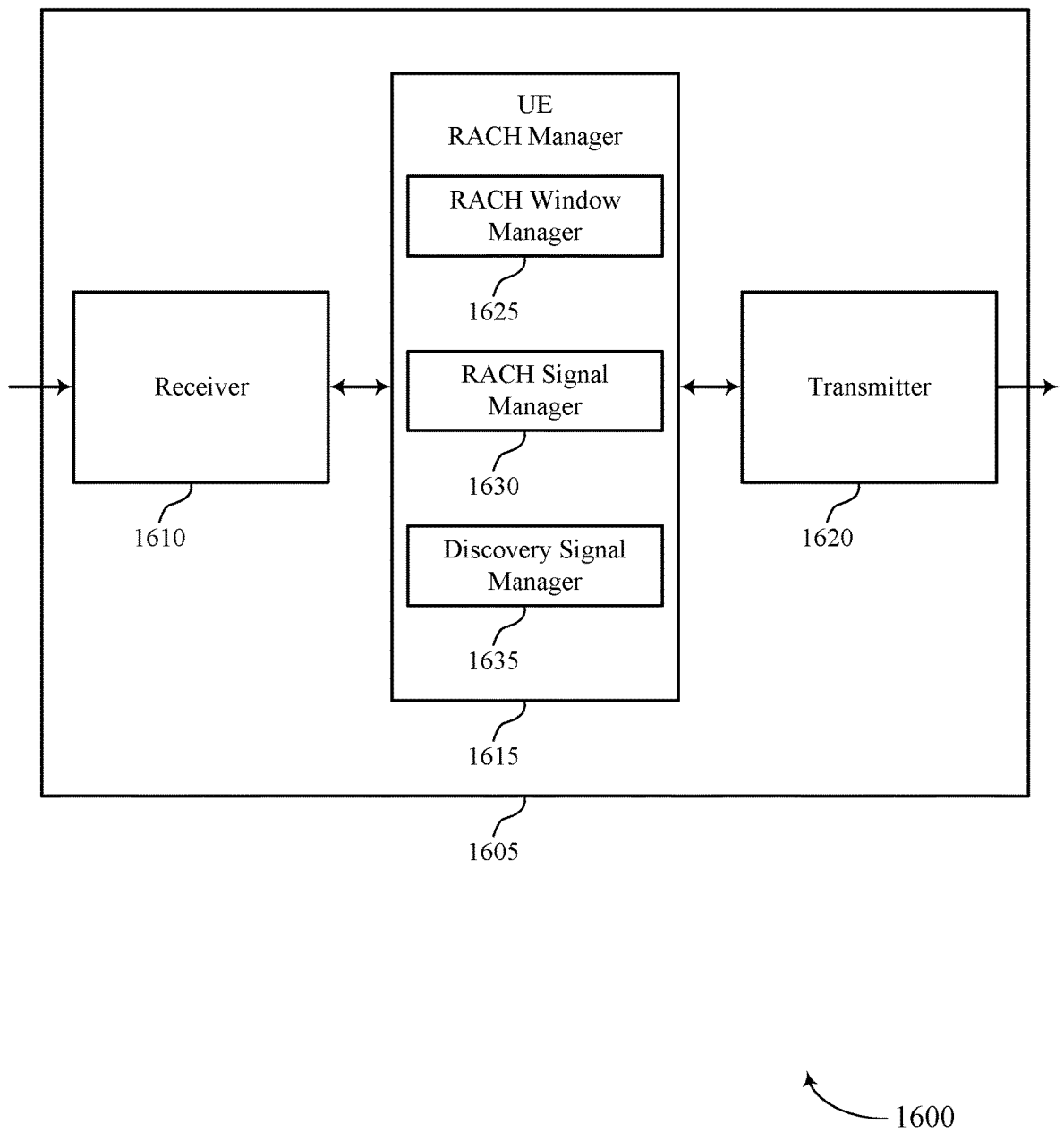

FIG. 16 shows a block diagram 1600 of a wireless device 1605 that supports RACH window design in mmW shared spectrum in accordance with one or more aspects of the present disclosure. Wireless device 1605 may be an example of aspects of a wireless device 1505 or a UE 115 as described with reference to FIG. 15. Wireless device 1605 may include receiver 1610, UE RACH manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to RACH window design in mmW shared spectrum, etc.). Information may be passed on to other components of the device. Receiver 1610 may be an example of aspects of the transceiver 1835 described with reference to FIG. 18. Receiver 1610 may utilize a single antenna or a set of antennas.

UE RACH manager 1615 may be an example of aspects of UE RACH manager 1815 described with reference to FIG. 18. UE RACH manager 1615 may also include RACH window manager 1625, RACH signal manager 1630, and discovery signal manager 1635.

RACH window manager 1625 may initiate a RACH procedure during a RACH window, where a timing of the RACH window is based on receiving the directional beam discovery signal, identify a first communication resource used for the RACH window, determine that the RACH window begins after the beam discovery window, determine when the RACH window begins based on receiving a burst of directional beam discovery signals, where the directional beam discovery signal is one of the burst of directional beam discovery signals, and identify a beam discovery window and a timing of a RACH window relative to the beam discovery window in a shared frequency spectrum band based on a single control signal received from a base station 105, 205, 505, 905, and 1405, where the RACH window is located in a fixed position relative to the beam discovery window. In some cases, the RACH window is positioned during the beam discovery window. In some cases, the RACH window is positioned after a first portion of the burst of directional beam discovery signals is received and before a second portion of the burst of directional beam discovery signals is received. In some cases, the RACH window is positioned before the beam discovery window. In some cases, the RACH window is positioned after the beam discovery window. In some cases, the RACH window includes a set of RACH opportunities, each RACH opportunity associated with a directional beam of the shared frequency spectrum band.

RACH signal manager 1630 may transmit a directional RACH signal during the RACH window. In some cases, the directional RACH signal is transmitted after the burst of directional beam discovery signals is received. In some cases, the directional RACH signal is transmitted before the burst of directional beam discovery signals is received.

Discovery signal manager 1635 may receive the burst of directional beam discovery signals until a beginning of the first communication resource used for the RACH window, receive the burst of directional beam discovery signals until a second communication resource occurring before the first communication resource, receive a burst of directional beam discovery signals until an end of the last communication resource used for the beam discovery window, and receive a burst of directional beam discovery signals transmitted during the beam discovery window.

Transmitter 1620 may transmit signals generated by other components of the device. In some examples, transmitter 1620 may be collocated with a receiver 1610 in a transceiver module. For example, transmitter 1620 may be an example of aspects of the transceiver 1835 described with reference to FIG. 18. Transmitter 1620 may utilize a single antenna or a set of antennas.

Figure 17:
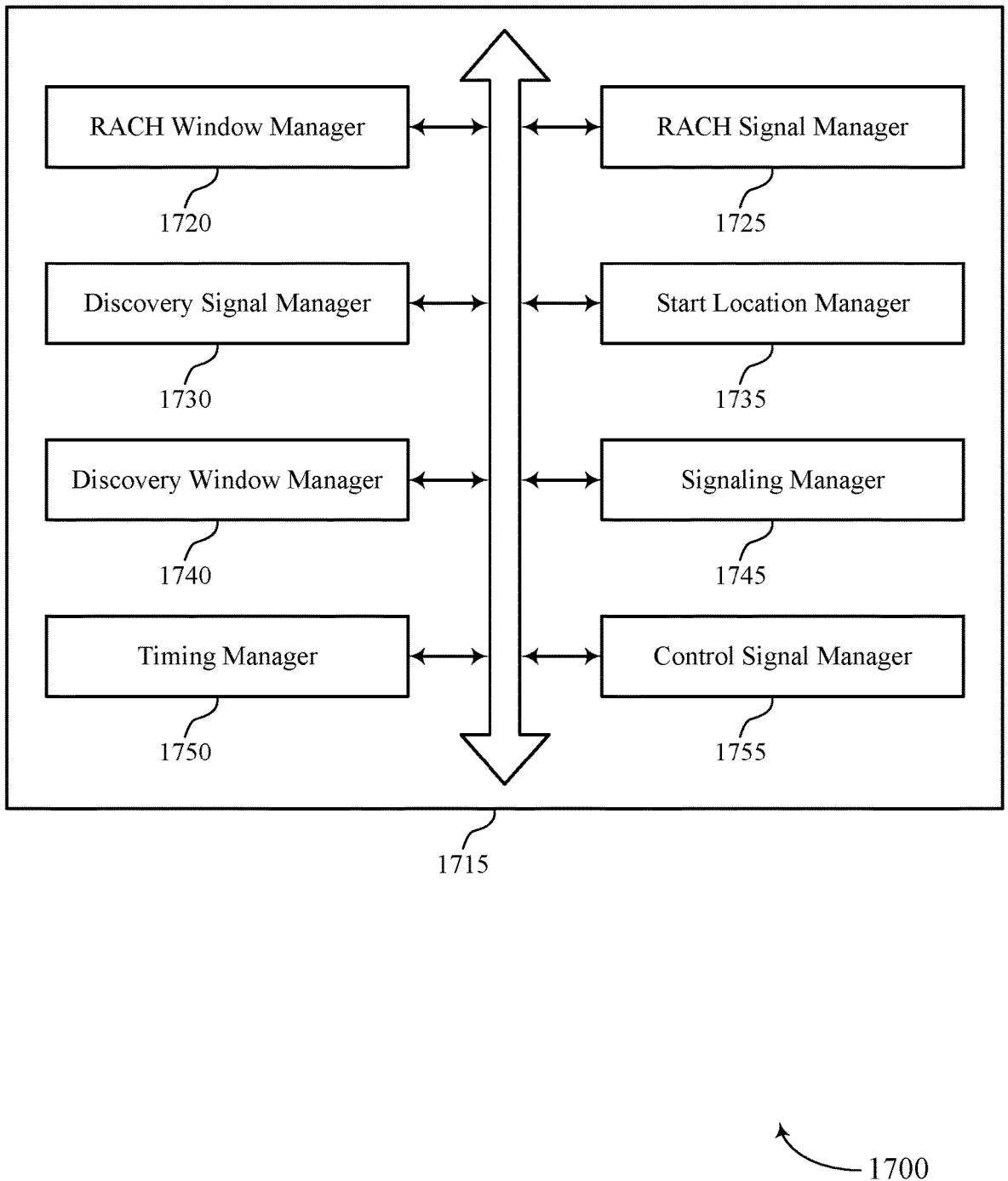

FIG. 17 shows a block diagram 1700 of UE RACH manager 1715 that supports RACH window design in mmW shared spectrum in accordance with one or more aspects of the present disclosure. The UE RACH manager 1715 may be an example of aspects of UE RACH manager 1515, 1615, or 1815 described with reference to FIGS. 15, 16, and 18. The UE RACH manager 1715 may include RACH window manager 1720, RACH signal manager 1725, discovery signal manager 1730, start location manager 1735, discovery window manager 1740, signaling manager 1745, timing manager 1750, and control signal manager 1755. Each of these modules may communicate, directly or indirectly, with one another (e.g., via one or more buses).

RACH window manager 1720 may initiate a RACH procedure during a RACH window, where a timing of the RACH window is based on receiving the directional beam discovery signal, identify a first communication resource used for the RACH window, determine that the RACH window begins after the beam discovery window, determine when the RACH window begins based on receiving a burst of directional beam discovery signals, where the directional beam discovery signal is one of the burst of directional beam discovery signals, and identify a beam discovery window and a timing of a RACH window relative to the beam discovery window in a shared frequency spectrum band based on a single control signal received from a base station 105, where the RACH window is located in a fixed position relative to the beam discovery window. In some cases, the RACH window is positioned during the beam discovery window. In some cases, the RACH window is positioned after a first portion of the burst of directional beam discovery signals is received and before a second portion of the burst of directional beam discovery signals is received. In some cases, the RACH window is positioned before the beam discovery window. In some cases, the RACH window is positioned after the beam discovery window. In some cases, the RACH window includes a set of RACH opportunities, each RACH opportunity associated with a directional beam of the shared frequency spectrum band.

RACH signal manager 1725 may transmit a directional RACH signal during the RACH window. In some cases, the directional RACH signal is transmitted after the burst of directional beam discovery signals is received. In some cases, the directional RACH signal is transmitted before the burst of directional beam discovery signals is received.

Discovery signal manager 1730 may receive the burst of directional beam discovery signals until a beginning of the first communication resource used for the RACH window, receive the burst of directional beam discovery signals until a second communication resource occurring before the first communication resource, receive a burst of directional beam discovery signals until an end of the last communication resource used for the beam discovery window, and receive a burst of directional beam discovery signals transmitted during the beam discovery window.

Start location manager 1735 may identify a RACH window starting location that is selected to allow the burst of directional beam discovery signals to include a transmitted beam in each beam direction associated with a base station 105 and identify a starting time of the RACH window based on receiving the directional beam discovery signal.

Discovery window manager 1740 may identify a last communication resource of the beam discovery window, where the RACH window begins at a first available communication resource after the last communication resource and identify a last communication resource used for the beam discovery window. In some cases, the beam discovery window is a discovery reference signal (DRS) measurement timing configuration (DMTC).

Signaling manager 1745 may receive the starting time of the RACH window using a PBCH of the directional beam discovery signal and receive the starting time of the RACH window using a separate channel from a PBCH of the directional beam discovery signal, the separate channel being transmitted together with the directional beam discovery signal using a same directional beam.

Timing manager 1750 may identify a synchronization signal block index of the directional beam discovery signal and determine a timing of a base station 105 based on the synchronization signal block index.

Control signal manager 1755 may receive a control signal from the base station 105 that indicates the beam discovery window and the RACH window.

Figure 18:
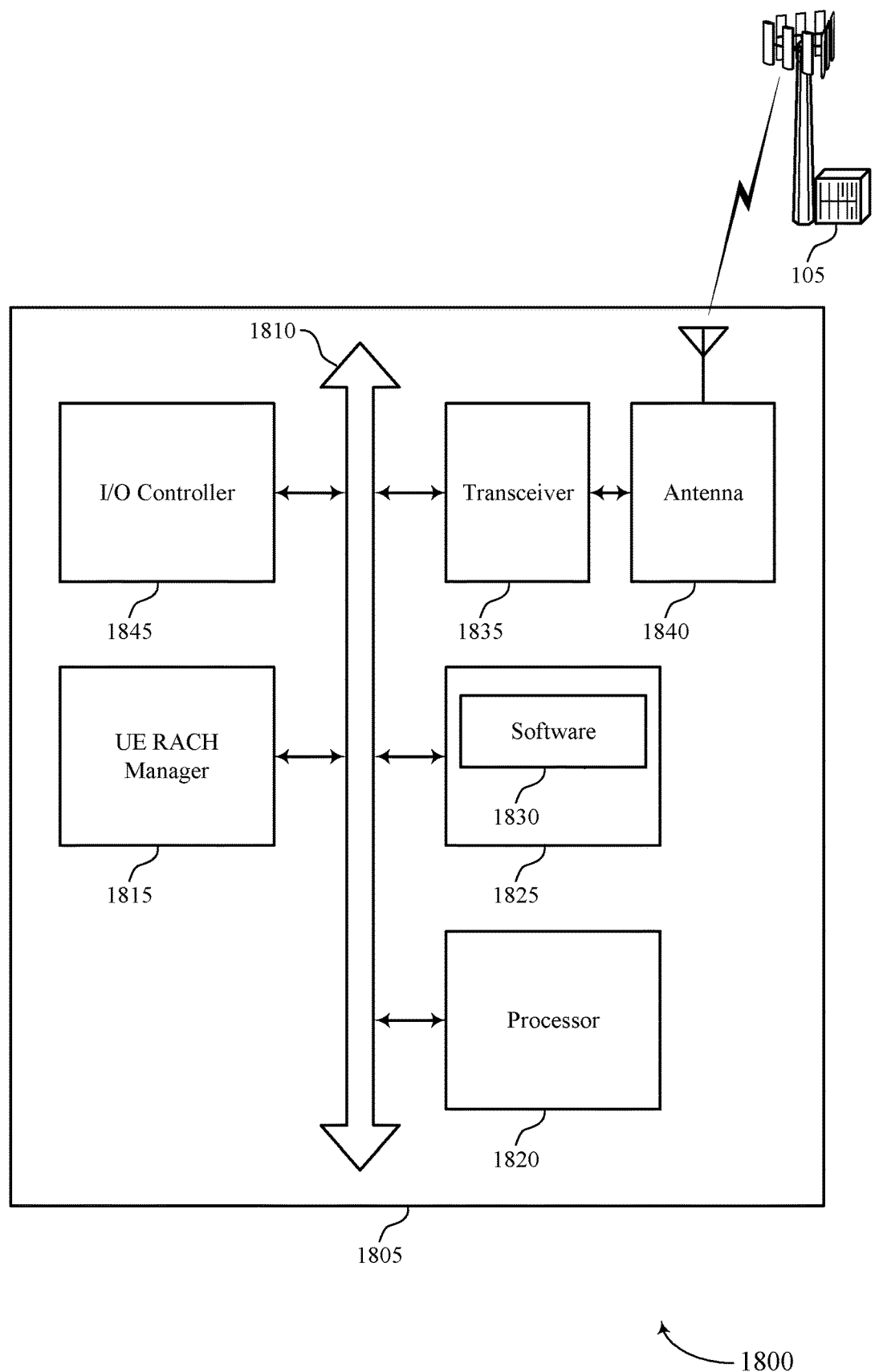
FIG. 18 illustrates a block diagram of a system including a UE that supports RACH window design in mmW shared spectrum in accordance with one or more aspects of the present disclosure.

FIG. 18 shows a diagram of a system 1800 including a device 1805 that supports RACH window design in mmW shared spectrum in accordance with one or more aspects of the present disclosure. Device 1805 may be an example of or include the components of wireless device 1505, wireless device 1605, or a UE 115 as described above, e.g., with reference to FIGS. 15 and 16. Device 1805 may include components for bi-directional voice and data communications including components for transmitting and receiving communications, including UE RACH manager 1815, processor 1820, memory 1825, software 1830, transceiver 1835, antenna 1840, and I/O controller 1845. These components may be in electronic communication via one or more buses (e.g., bus 1810). Device 1805 may communicate wirelessly with one or more base stations 105.

Processor 1820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting RACH window design in mmW shared spectrum).

Memory 1825 may include random access memory (RAM) and read only memory (ROM). Memory 1825 may store computer-readable, computer-executable software 1830 including instructions that, when executed, cause the processor to perform various functions described herein. In some cases, memory 1825 may contain, among other things, a basic input/output system (BIOS) which may control basic hardware or software operation such as the interaction with peripheral components or devices.

Software 1830 may include code to implement aspects of the present disclosure, including code to support RACH window design in mmW shared spectrum. Software 1830 may be stored in a non-transitory computer-readable medium such as system memory or other memory. In some cases, software 1830 may not be directly executable by the processor but may cause a computer (e.g., when compiled and executed) to perform functions described herein.

Transceiver 1835 may communicate bi-directionally, via one or more antennas, wired, or wireless links as described above. For example, transceiver 1835 may represent a wireless transceiver and may communicate bi-directionally with another wireless transceiver. Transceiver 1835 may also include a modem to modulate the packets and provide the modulated packets to the antennas for transmission, and to demodulate packets received from the antennas.

In some cases, the wireless device 1805 may include a single antenna 1840. However, in some cases the device 1805 may have more than one antenna 1840, which may be capable of concurrently transmitting or receiving multiple wireless transmissions.

I/O controller 1845 may manage input and output signals for device 1805. I/O controller 1845 may also manage peripherals not integrated into device 1805. In some cases, I/O controller 1845 may represent a physical connection or port to an external peripheral. In some cases, I/O controller 1845 may utilize an operating system such as iOS®, ANDROID®, MS-DOS®, MS-WINDOWS®, OS/2®, UNIX®, LINUX®, or another known operating system. In other cases, I/O controller 1845 may represent or interact with a modem, a keyboard, a mouse, a touchscreen, or a similar device. In some cases, I/O controller 1845 may be implemented as part of a processor. In some cases, a user may interact with device 1805 via I/O controller 1845 or via hardware components controlled by I/O controller 1845.

Figure 19:
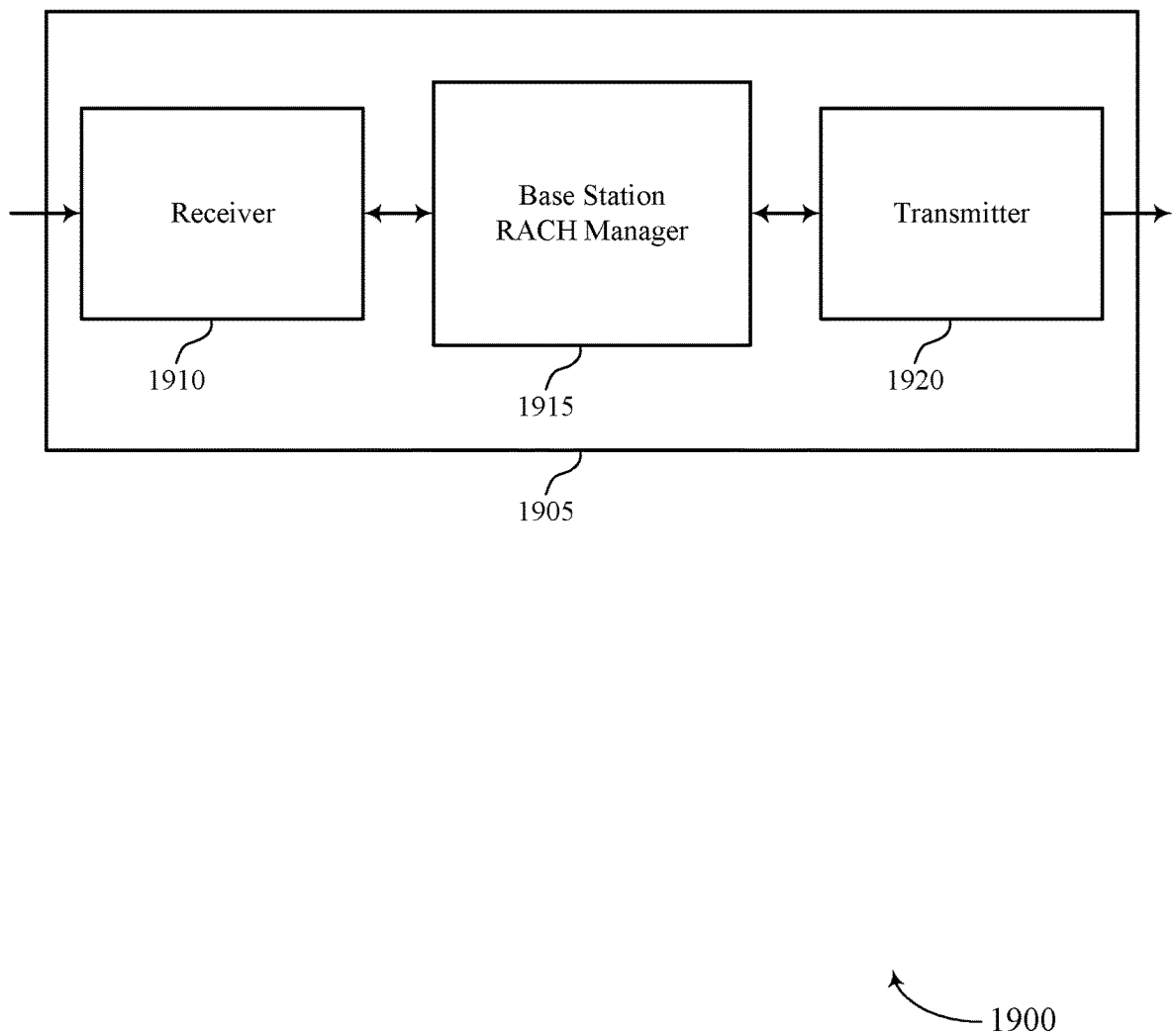
FIGS. 19 through 21 show block diagrams of a device that supports RACH window design in mmW shared spectrum in accordance with one or more aspects of the present disclosure.

FIG. 19 shows a block diagram 1900 of a wireless device 1905 that supports RACH window design in mmW shared spectrum in accordance with one or more aspects of the present disclosure. Wireless device 1905 may be an example of aspects of a base station 105 as described herein. Wireless device 1905 may include receiver 1910, base station RACH manager 1915, and transmitter 1920. Wireless device 1905 may also include a processor. Each of these components may be in communication with one another (e.g., via one or more buses).

Receiver 1910 may receive information such as packets, user data, or control information associated with various information channels (e.g., control channels, data channels, and information related to RACH window design in mmW shared spectrum, etc.). Information may be passed on to other components of the device. Receiver 1910 may be an example of aspects of transceiver 2235 described with reference to FIG. 22. Receiver 1910 may utilize a single antenna or a set of antennas.

Base station RACH manager 1915 may be an example of aspects of base station RACH manager 2215 described with reference to FIG. 22. Base station RACH manager 1915 and/or at least some of its various sub-components may be implemented in hardware, software executed by a processor, firmware, or any combination thereof. If implemented in software executed by a processor, the functions of base station RACH manager 1915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station RACH manager 1915 and/or at least some of its various sub-components may be physically located at various positions, including being distributed such that portions of functions are implemented at different physical locations by one or more physical devices. In some examples, base station RACH manager 1915 and/or at least some of its various sub-components may be a separate and distinct component in accordance with various aspects of the present disclosure. In other examples, base station RACH manager 1915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station RACH manager 1915 may determine that communication resources on a shared frequency spectrum band are available for use during a beam discovery window based on an LBT procedure, identify a timing of a RACH window that begins after the burst of directional beam discovery signals are transmitted based on the LBT procedure indicating the available communication resources, and receive a directional RACH signal during the RACH window. Base station RACH manager 1915 may also determine that communication resources on a shared frequency spectrum band are available for use during a beam discovery window based on an LBT procedure, determine a timing of a RACH window relative to the beam discovery window that is located in a fixed position relative to the beam discovery window, and receive a directional RACH signal during the RACH window.

Transmitter 1920 may transmit signals generated by other components of the device. In some examples, transmitter 1920 may be collocated with receiver 1910 in a transceiver module. For example, transmitter 1920 may be an example of aspects of transceiver 2235 described with reference to FIG. 22. Transmitter 1920 may utilize a single antenna or a set of antennas.

Transmitter 1920 may transmit a burst of directional beam discovery signals during the beam discovery window based on the LBT procedure indicating available communication resources, transmit a control signal to a target UE that indicates the beam discovery window and a RACH window in the shared frequency spectrum band based on determining the RACH window, and transmit a burst of directional beam discovery signals during the beam discovery window.

Figure 20:
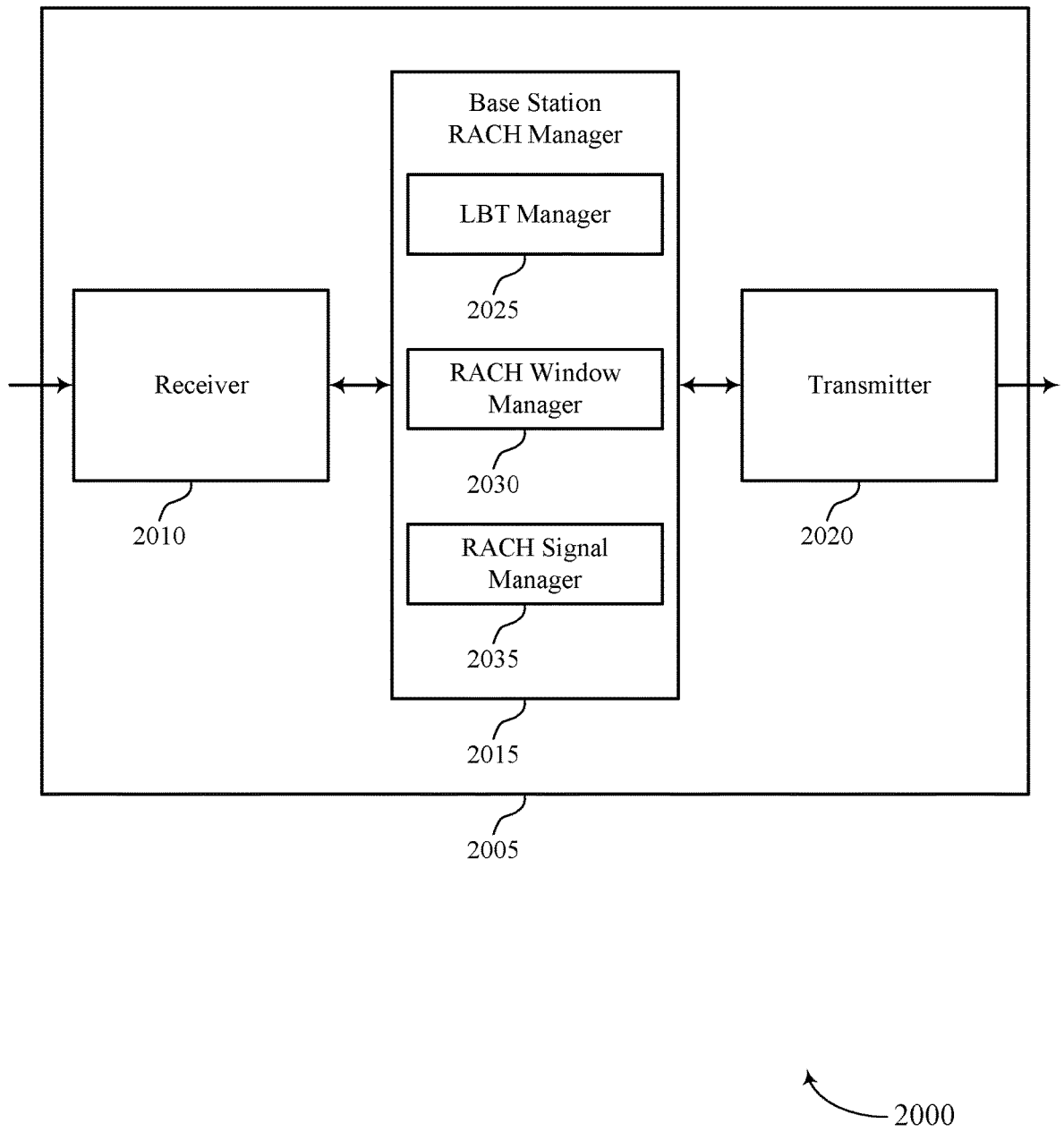

FIG. 20 shows a block diagram 2000 of a wireless device 2005 that supports RACH window design in mmW shared spectrum in accordance with one or more aspects of the present disclosure. Wireless device 2005 may be an example of aspects of a wireless device 1905 or a base station 105 as described with reference to FIG. 19. Wireless device 2005 may include receiver 2010, base station RACH manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to RACH window design in mmW shared spectrum, etc.). Information may be passed on to other components of the device. Receiver 2010 may be an example of aspects of the transceiver 2235 described with reference to FIG. 22. Receiver 2010 may utilize a single antenna or a set of antennas.

Base station RACH manager 2015 may be an example of aspects of base station RACH manager 2215 described with reference to FIG. 22. Base station RACH manager 2015 may also include LBT manager 2025, RACH window manager 2030, and RACH signal manager 2035.

LBT manager 2025 may determine that communication resources on a shared frequency spectrum band are available for use during a beam discovery window based on an LBT procedure.

RACH window manager 2030 may identify a timing of a RACH window that begins after the burst of directional beam discovery signals are transmitted based on the LBT procedure indicating the available communication resources, signal the timing of the RACH window using at least one of burst of directional beam discovery signals, identify a first communication resource used for the RACH window, identify a first communication resource used for a RACH window, determine that the RACH window begins after the beam discovery window, determine a timing of a RACH window relative to the beam discovery window that is located in a fixed position relative to the beam discovery window, and interrupt a transmission of the burst of directional beam discovery signals to listen for the directional RACH signal during the RACH window based on the RACH window being positioned with the beam discovery window. In some cases, the RACH window is positioned before, during, or after the beam discovery window.

RACH signal manager 2035 may receive a directional RACH signal during the RACH window and listen in a unique direction during each RACH opportunity of the RACH window. In some cases, the directional RACH signal is received before, during, or after the burst of directional beam discovery signals is transmitted.

Transmitter 2020 may transmit signals generated by other components of the device. In some examples, the transmitter 2020 may be collocated with a receiver 2010 in a transceiver module. For example, transmitter 2020 may be an example of aspects of transceiver 2235 described with reference to FIG. 22. Transmitter 2020 may utilize a single antenna or a set of antennas.

Figure 21:
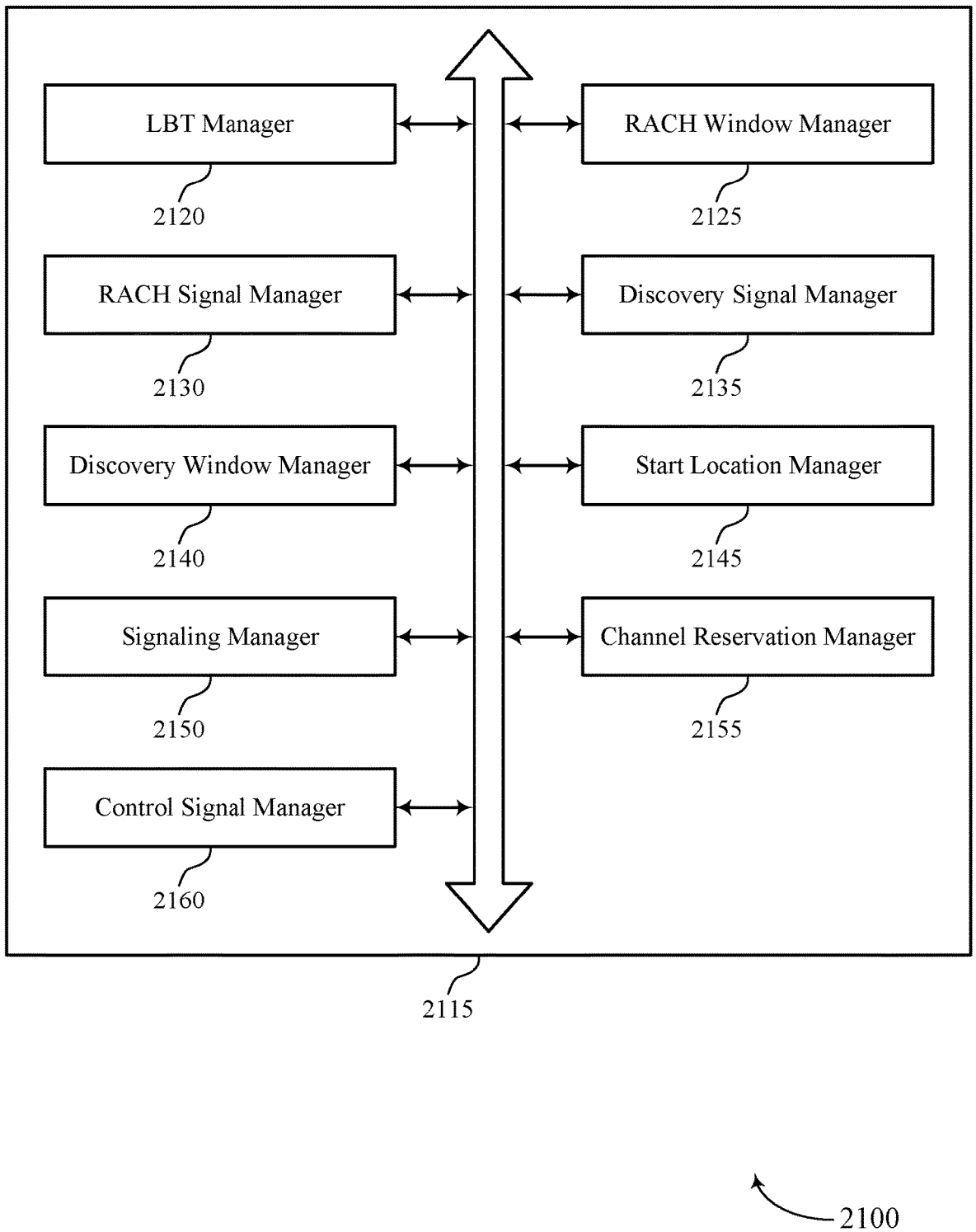

FIG. 21 shows a block diagram 2100 of base station RACH manager 2115 that supports RACH window design in mmW shared spectrum in accordance with one or more aspects of the present disclosure. Base station RACH manager 2115 may be an example of aspects of base station RACH manager 2215 described with reference to FIGS. 19, 20, and 22. Base station RACH manager 2115 may include LBT manager 2120, RACH window manager 2125, RACH signal manager 2130, discovery signal manager 2135, discovery window manager 2140, start location manager 2145, signaling manager 2150, channel reservation manager 2155, and control signal manager 2160. Each of these modules may communicate, directly or indirectly, with one another (e.g., via one or more buses).

LBT manager 2120 may determine that communication resources on a shared frequency spectrum band are available for use during a beam discovery window based on an LBT procedure.

RACH window manager 2125 may identify a timing of a RACH window that begins after the burst of directional beam discovery signals are transmitted based on the LBT procedure indicating the available communication resources, signal the timing of the RACH window using at least one of burst of directional beam discovery signals, identify a first communication resource used for the RACH window, identify a first communication resource used for a RACH window, determine that the RACH window begins after the beam discovery window, determine a timing of a RACH window relative to the beam discovery window that is located in a fixed position relative to the beam discovery window, and interrupt a transmission of the burst of directional beam discovery signals to listen for the directional RACH signal during the RACH window based on the RACH window being positioned with the beam discovery window. In some cases, the RACH window is positioned before, during, or after the beam discovery window.

RACH signal manager 2130 may receive a directional RACH signal during the RACH window and listen in a unique direction during each RACH opportunity of the RACH window. In some cases, the directional RACH signal is received before, during, or after the burst of directional beam discovery signals is transmitted.

Discovery signal manager 2135 may transmit the burst of directional beam discovery signals until a beginning of the first communication resources used for the RACH window, transmit the burst of directional beam discovery signals until a second communication resource occurring before the first communication resource, transmit the burst of directional beam discovery signals until and including the last communication resource used for the beam discovery window, and resume the transmission of the burst of directional beam discovery signals after the RACH window is finished. In some cases, each directional beam discovery signal of the burst of directional beam discovery signals is pointed in a different beam direction.

Discovery window manager 2140 may identify a last communication resource used for the beam discovery window and identify a last communication resource of the beam discovery window, where the RACH window begins at a first available communication resource after the last communication resource.

Start location manager 2145 may select a starting location for the RACH window to allow the burst of directional beam discovery signals to include a transmitted beam in each beam direction associated with the base station 105 and identify a starting time of the RACH window based on the LBT procedure indicating the available communication resources.

Signaling manager 2150 may transmit the starting time of the RACH window using a PBCH of at least one of the burst of directional beam discovery signals and transmit the starting time of the RACH window using a separate channel from the a PBCH of at least one of the burst of directional beam discovery signals, the separate channel being transmitted together with at least one of the burst of directional beam discovery signals using a same directional beam.

Channel reservation manager 2155 may broadcast a single channel reservation signal to a set of UEs 115 that reserves communication resources of the shared frequency spectrum band for both a beam discovery procedure associated with the beam discovery window and a RACH procedure associated with the RACH window for the target UE based on the RACH window being positioned either before or after the beam discovery window.

Control signal manager 2160 may transmit a single control signal to the target UE that indicates the beam discovery window and the RACH window.

Figure 22:
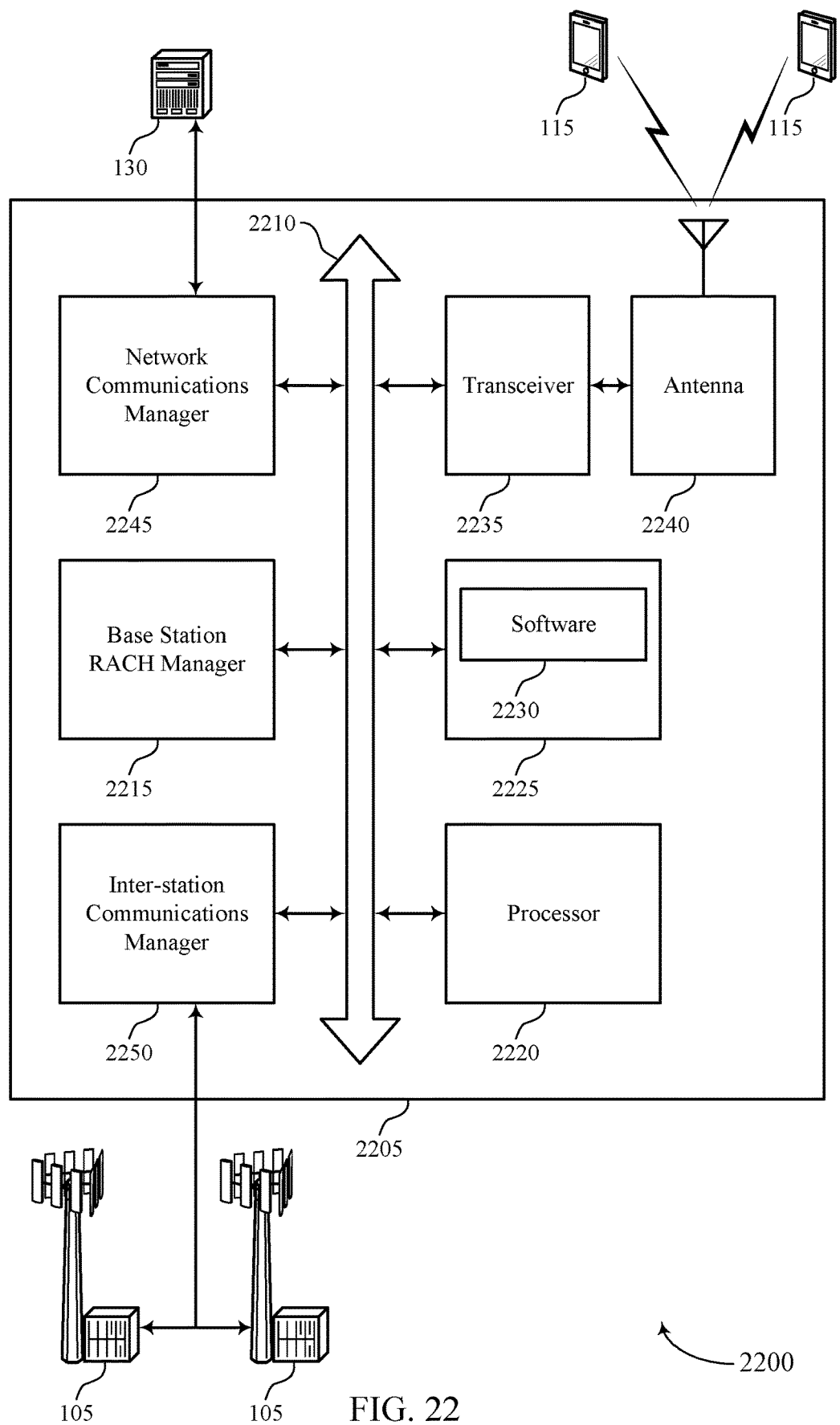
FIG. 22 illustrates a block diagram of a system including a base station that supports RACH window design in mmW shared spectrum in accordance with one or more aspects of the present disclosure.

FIG. 22 shows a diagram of a system 2200 including a device 2205 that supports RACH window design in mmW shared spectrum in accordance with one or more aspects of the present disclosure. Device 2205 may be an example of or include the components of base station 105 as described above, e.g., with reference to FIG. 1. Device 2205 may include components for bi-directional voice and data communications including components for transmitting and receiving communications, including base station RACH manager 2215, processor 2220, memory 2225, software 2230, transceiver 2235, antenna 2240, network communications manager 2245, and inter-station communications manager 2250. These components may be in electronic communication via one or more buses (e.g., bus 2210). Device 2205 may communicate wirelessly with one or more UEs 115.

Processor 2220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2220 may be configured to operate a memory array using a memory controller. In other cases, a memory controller may be integrated into processor 2220. Processor 2220 may be configured to execute computer-readable instructions stored in a memory to perform various functions (e.g., functions or tasks supporting RACH window design in mmW shared spectrum).

Memory 2225 may include RAM and ROM. Memory 2225 may store computer-readable, computer-executable software 2230 including instructions that, when executed, cause the processor to perform various functions described herein. In some cases, memory 2225 may contain, among other things, a BIOS which may control basic hardware or software operation such as the interaction with peripheral components or devices.

Software 2230 may include code to implement aspects of the present disclosure, including code to support RACH window design in mmW shared spectrum. Software 2230 may be stored in a non-transitory computer-readable medium such as system memory or other memory. In some cases, the software 2230 may not be directly executable by the processor but may cause a computer (e.g., when compiled and executed) to perform functions described herein.

Transceiver 2235 may communicate bi-directionally, via one or more antennas, wired, or wireless links as described above. For example, transceiver 2235 may represent a wireless transceiver and may communicate bi-directionally with another wireless transceiver. Transceiver 2235 may also include a modem to modulate the packets and provide the modulated packets to the antennas for transmission, and to demodulate packets received from the antennas.

In some cases, the wireless device 2205 may include a single antenna 2240. However, in some cases the device 2205 may have more than one antenna 2240, which may be capable of concurrently transmitting or receiving multiple wireless transmissions.

Network communications manager 2245 may manage communications with the core network (e.g., via one or more wired backhaul links). For example, the network communications manager 2245 may manage the transfer of data communications for client devices, such as one or more UEs 115.

Inter-station communications manager 2250 may manage communications with other base station 105, and may include a controller or scheduler for controlling communications with UEs 115 in cooperation with other base stations 105. For example, inter-station communications manager 2250 may coordinate scheduling for transmissions to UEs 115 for various interference mitigation techniques such as beamforming or joint transmission. In some examples, inter-station communications manager 2250 may provide an X2 interface within an Long Term Evolution (LTE)/LTE-A wireless communication network technology to provide communication between base stations 105.

Figure 23:
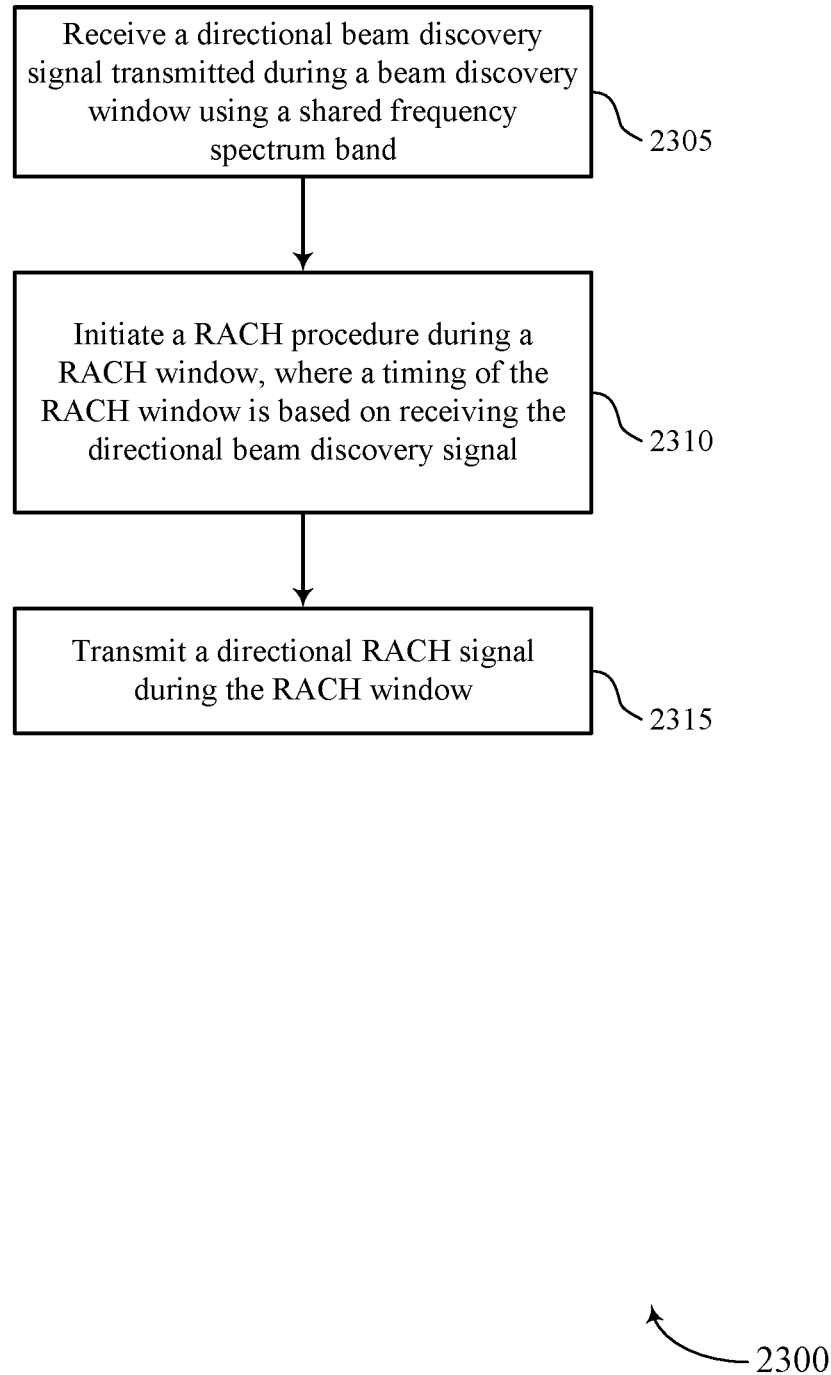
FIGS. 23 through 27 illustrate methods for RACH window design in mmW shared spectrum in accordance with one or more aspects of the present disclosure.

FIG. 23 shows a flowchart illustrating a method 2300 for RACH window design in mmW shared spectrum in accordance with one or more aspects of the present disclosure. The operations of method 2300 may be implemented by a UE 115 or its components as described herein. For example, the operations of method 2300 may be performed by UE RACH manager 1515, 1615, 1715, and 1815 as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At 2305, the UE 115 may receive a directional beam discovery signal transmitted during a beam discovery window using a shared frequency spectrum band. The operations of block 2305 may be performed according to the methods described herein. In certain examples, aspects of the operations of block 2305 may be performed by receiver 1510, 1610 and 1835 as described with reference to FIGS. 15, 16 and 18.

At 2310, the UE 115 may initiate a RACH procedure during a RACH window, wherein a timing of the RACH window is based at least in part on receiving the directional beam discovery signal. The operations of block 2310 may be performed according to the methods described herein. In certain examples, aspects of the operations of block 2310 may be performed by RACH window manager 1515, 1625, 1720, and 1815 as described with reference to FIGS. 15 through 18.

At 2315, the UE 115 may transmit a directional RACH signal during the RACH window. The operations of block 2315 may be performed according to the methods described herein. In certain examples, aspects of the operations of block 2315 may be performed by RACH signal manager 1515, 1630, 1725, and 1815 as described with reference to FIGS. 15 through 18.

Figure 24:
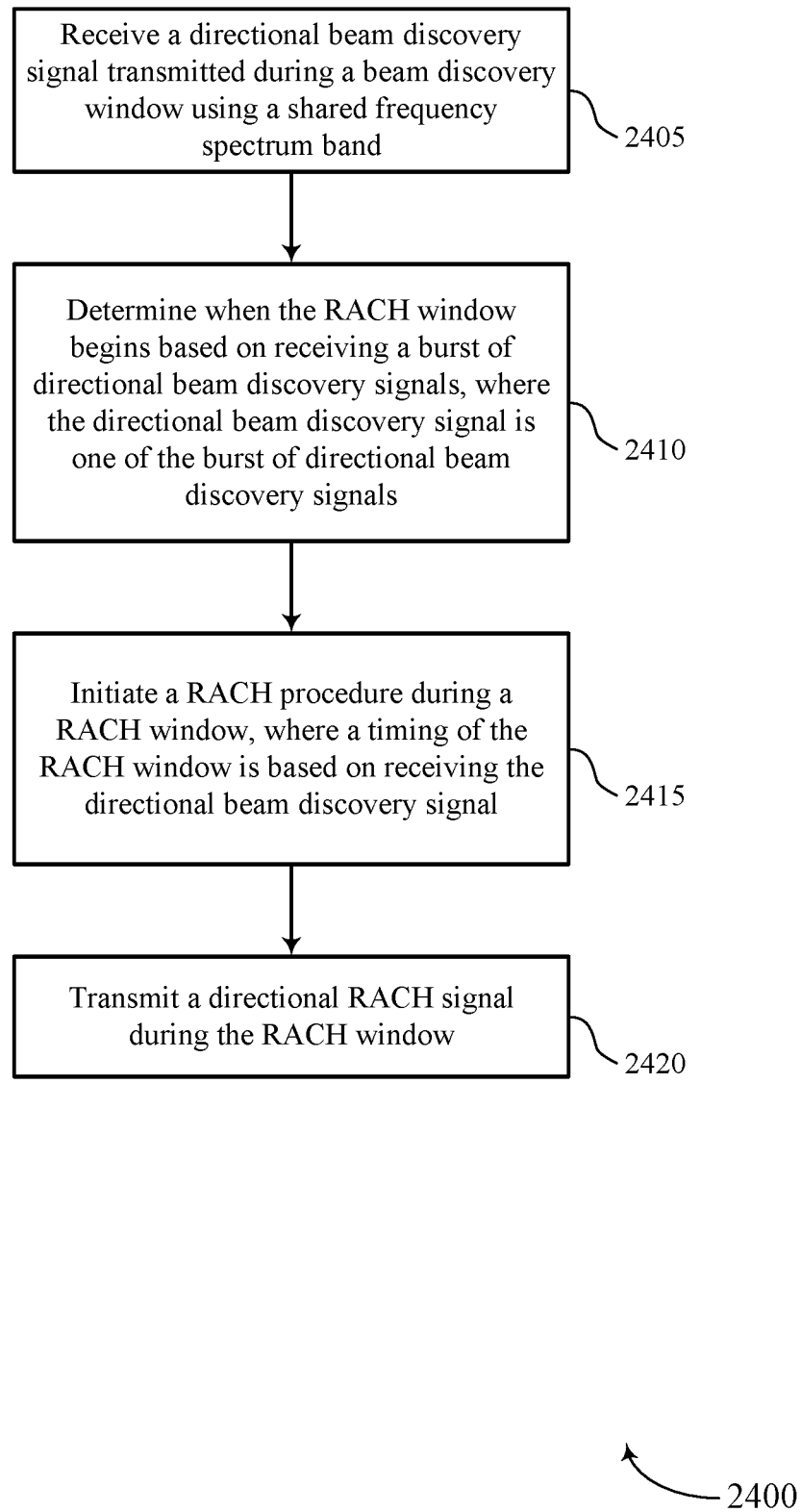

FIG. 24 shows a flowchart illustrating a method 2400 for RACH window design in mmW shared spectrum in accordance with one or more aspects of the present disclosure. The operations of method 2400 may be implemented by a UE 115 or its components as described herein. For example, the operations of method 2400 may be performed by UE RACH manager 1515, 1615, 1715, and 1815 as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At 2405, the UE 115 may receive a directional beam discovery signal transmitted during a beam discovery window using a shared frequency spectrum band. The operations of block 2405 may be performed according to the methods described herein. In certain examples, aspects of the operations of block 2405 may be performed by receiver 1510, 1610, and 1835 as described with reference to FIGS. 15, 16, and 18.

At 2410, the UE 115 may determine when the RACH window begins based at least in part on receiving a burst of directional beam discovery signals, wherein the directional beam discovery signal is one of the burst of directional beam discovery signals. The operations of block 2410 may be performed according to the methods described herein. In certain examples, aspects of the operations of block 2410 may be performed by RACH window manager 1515, 1625, 1720, and 1815 as described with reference to FIGS. 15 through 18.

At 2415, the UE 115 may initiate a RACH procedure during a RACH window, wherein a timing of the RACH window is based at least in part on receiving the directional beam discovery signal. The operations of block 2415 may be performed according to the methods described herein. In certain examples, aspects of the operations of block 2415 may be performed by RACH window manager 1515, 1625, 1720, and 1815 as described with reference to FIGS. 15 through 18.

At 2420, the UE 115 may transmit a directional RACH signal during the RACH window. The operations of block 2420 may be performed according to the methods described herein. In certain examples, aspects of the operations of block 2420 may be performed by RACH signal manager 1515, 1630, 1725, and 1815 as described with reference to FIGS. 15 through 18.

Figure 25:
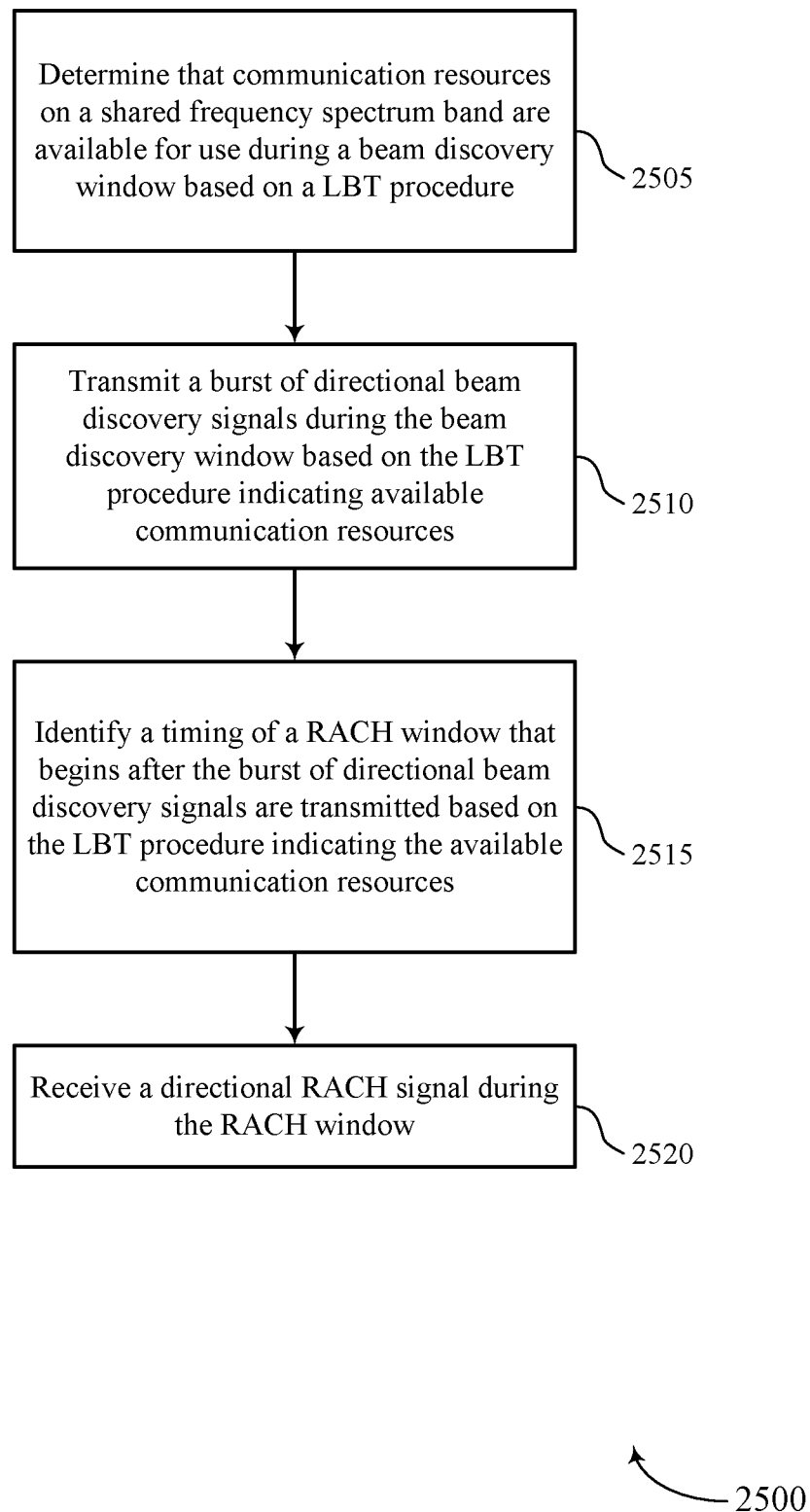

FIG. 25 shows a flowchart illustrating a method 2500 for RACH window design in mmW shared spectrum in accordance with one or more aspects of the present disclosure. The operations of method 2500 may be implemented by a base station 105 or its components as described herein. For example, the operations of method 2500 may be performed by base station RACH manager 1915, 2015, 2115, and 2215 as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At 2505, the base station 105 may determine that communication resources on a shared frequency spectrum band are available for use during a beam discovery window based at least in part on an LBT procedure. The operations of block 2505 may be performed according to the methods described herein. In certain examples, aspects of the operations of block 2505 may be performed by LBT manager 1915, 2025, 2120, and 2215 as described with reference to FIGS. 19 through 22.

At 2510, the base station 105 may transmit a burst of directional beam discovery signals during the beam discovery window based at least in part on the LBT procedure indicating available communication resources. The operations of block 2510 may be performed according to the methods described herein. In certain examples, aspects of the operations of block 2510 may be performed by transmitter 1920, 2020, and 2235 as described with reference to FIGS. 19, 20, and 22.

At 2515, the base station 105 may identify a timing of a RACH window that begins after the burst of directional beam discovery signals are transmitted based at least in part on the LBT procedure indicating the available communication resources. The operations of block 2515 may be performed according to the methods described herein. In certain examples, aspects of the operations of block 2515 may be performed by RACH window manager 1915, 2030, 2125, and 2215 as described with reference to FIGS. 19 through 22.

At 2520, the base station 105 may receive a directional RACH signal during the RACH window. The operations of block 2520 may be performed according to the methods described herein. In certain examples, aspects of the operations of block 2520 may be performed by RACH signal manager 1915, 2035, 2130, and 2215 as described with reference to FIGS. 19 through 22.

Figure 26:
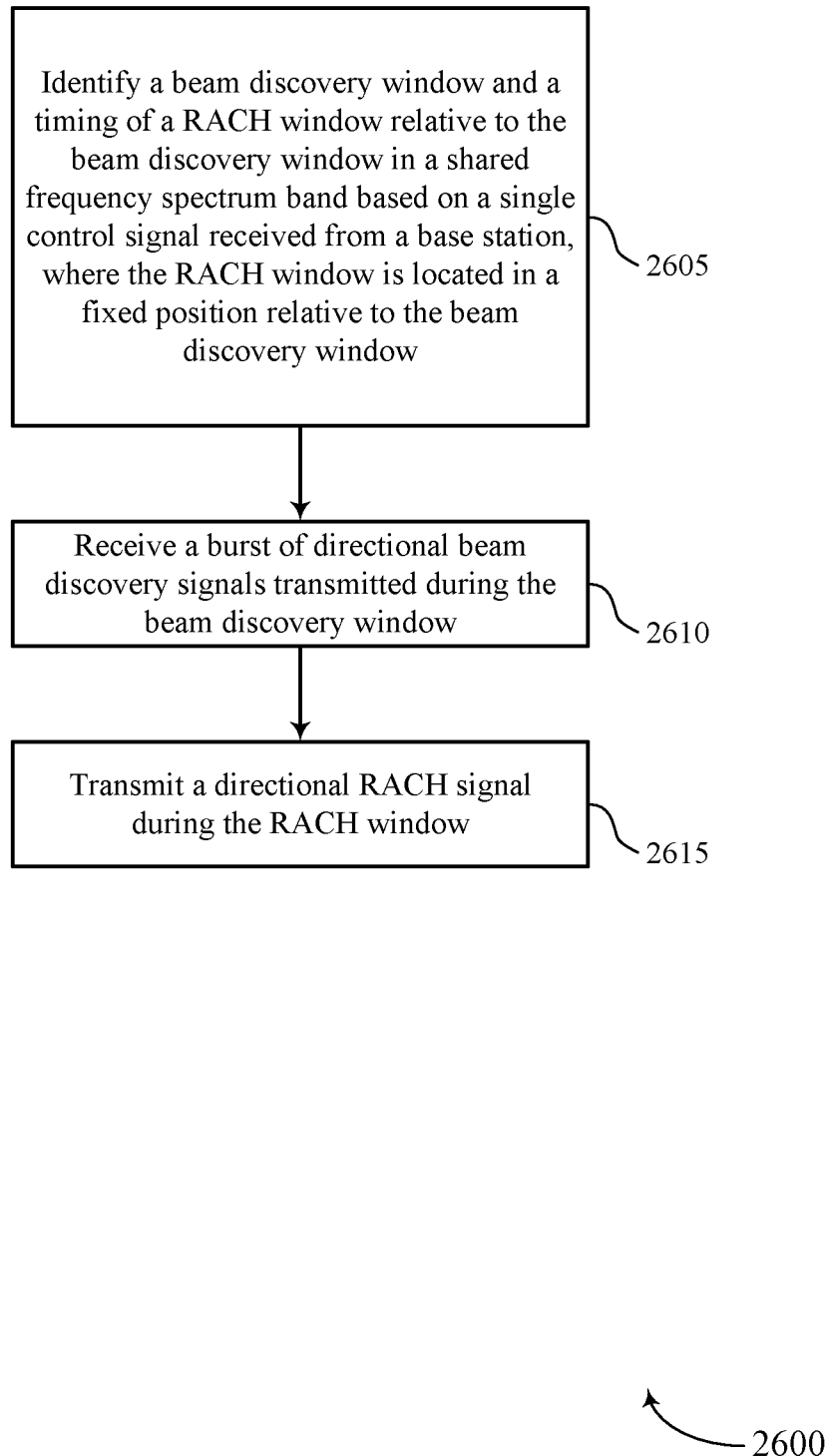

FIG. 26 shows a flowchart illustrating a method 2600 for RACH window design in mmW shared spectrum in accordance with one or more aspects of the present disclosure. The operations of method 2600 may be implemented by a UE 115 or its components as described herein. For example, the operations of method 2600 may be performed by UE RACH manager 1515, 1615, 1715, and 1815 as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At 2605, the UE 115 may identify a beam discovery window and a timing of a RACH window relative to the beam discovery window in a shared frequency spectrum band based at least in part on a single control signal received from a base station 105, wherein the RACH window is located in a fixed position relative to the beam discovery window. The operations of block 2605 may be performed according to the methods described herein. In certain examples, aspects of the operations of block 2605 may be performed by RACH window manager 1515, 1625, 1720, and 1815 as described with reference to FIGS. 15 through 18.

At 2610, the UE 115 may receive a burst of directional beam discovery signals transmitted during the beam discovery window. The operations of block 2610 may be performed according to the methods described herein. In certain examples, aspects of the operations of block 2610 may be performed by discovery signal manager 1515, 1635, 1730, and 1815 as described with reference to FIGS. 15 through 18.

At 2615, the UE 115 may transmit a directional RACH signal during the RACH window. The operations of block 2615 may be performed according to the methods described herein. In certain examples, aspects of the operations of block 2615 may be performed by RACH signal manager 1515, 1630, 1725, and 1815 as described with reference to FIGS. 15 through 18.

Figure 27:
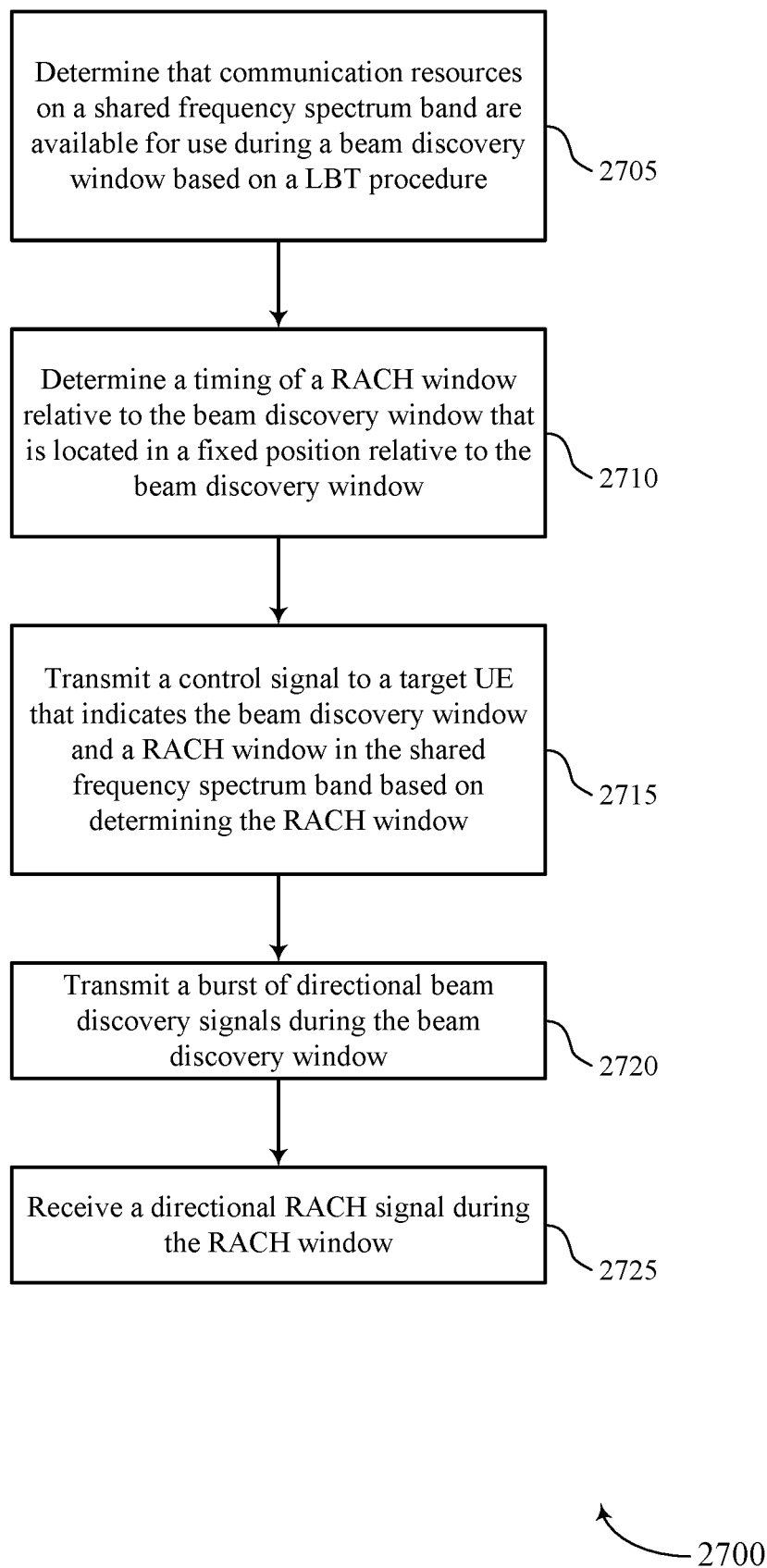

FIG. 27 shows a flowchart illustrating a method 2700 for RACH window design in mmW shared spectrum in accordance with one or more aspects of the present disclosure. The operations of method 2700 may be implemented by a base station 105 or its components as described herein. For example, the operations of method 2700 may be performed by base station RACH manager 1915, 2015, 2115, and 2215 as described with reference to FIGS. 19 through 22. In some examples, a base station 105 may execute a set of codes to control the functional elements of the device to perform the functions described below. Additionally or alternatively, the base station 105 may perform aspects of the functions described below using special-purpose hardware.

At 2705, the base station 105 may determine that communication resources on a shared frequency spectrum band are available for use during a beam discovery window based at least in part on an LBT procedure. The operations of block 2705 may be performed according to the methods described herein. In certain examples, aspects of the operations of block 2705 may be performed by LBT manager 1915, 2025, 2120, and 2215 as described with reference to FIGS. 19 through 22.

At 2710, the base station 105 may determine a timing of a RACH window relative to the beam discovery window that is located in a fixed position relative to the beam discovery window. The operations of block 2710 may be performed according to the methods described herein. In certain examples, aspects of the operations of block 2710 may be performed by RACH window manager 1915, 2030, 2125, and 2015 as described with reference to FIGS. 19 through 22.

At 2715, the base station 105 may transmit a control signal to a target UE that indicates the beam discovery window and a RACH window in the shared frequency spectrum band based at least in part on determining the RACH window. The operations of block 2715 may be performed according to the methods described herein. In certain examples, aspects of the operations of block 2715 may be performed by transmitter 1920, 2020, and 2235 as described with reference to FIGS. 19, 20, and 22.

At 2720, the base station 105 may transmit a burst of directional beam discovery signals during the beam discovery window. The operations of block 2720 may be performed according to the methods described herein. In certain examples, aspects of the operations of block 2720 may be performed by transmitter 1920, 2020, and 2235 as described with reference to FIGS. 19, 20, and 22.

At 2725, the base station 105 may receive a directional RACH signal during the RACH window. The operations of block 2725 may be performed according to the methods described herein. In certain examples, aspects of the operations of block 2725 may be performed by a RACH signal manager as described with reference to FIGS. 19 through 22.

It should be noted that the methods described above describe possible implementations, and that the operations may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a directional beam discovery signal transmitted during a beam discovery window using a shared frequency spectrum band;
   initiating a random access channel (RACH) procedure during a RACH window, wherein a timing of the RACH window is based at least in part on receiving the directional beam discovery signal; and
   transmitting a directional RACH signal during the RACH window.

2. The method of claim 1, further comprising:
   determining when the RACH window begins based at least in part on receiving a burst of directional beam discovery signals, wherein the directional beam discovery signal is one of the burst of directional beam discovery signals.

3. The method of claim 2, further comprising:
   identifying a first communication resource used for the RACH window; and
   receiving the burst of directional beam discovery signals until a beginning of the first communication resource used for the RACH window.

4. The method of claim 2, further comprising:
   identifying a first communication resource used for the RACH window; and
   receiving the burst of directional beam discovery signals until a second communication resource occurring before the first communication resource.

5. The method of claim 2, further comprising:
   identifying a RACH window starting location that is selected to allow the burst of directional beam discovery signals to include a transmitted beam in each beam direction associated with a base station.

6. The method of claim 1, further comprising:
   determining that the RACH window begins after the beam discovery window.

7. The method of claim 6, further comprising:
   identifying a last communication resource of the beam discovery window, wherein the RACH window begins at a first available communication resource after the last communication resource.

8. The method of claim 6, further comprising:
   identifying a last communication resource used for the beam discovery window; and
   receiving a burst of directional beam discovery signals until an end of the last communication resource used for the beam discovery window.

9. The method of claim 1, further comprising:
   identifying a starting time of the RACH window based at least in part on receiving the directional beam discovery signal.

10. The method of claim 9, further comprising:
    receiving an offset indicative of a duration between a last communication resource used for the beam discovery window and the starting time of the RACH window.

11. The method of claim 9, further comprising:
    receiving the starting time of the RACH window using a physical broadcast channel (PBCH) of the directional beam discovery signal.

12. The method of claim 9, further comprising:
    receiving the starting time of the RACH window using a separate channel from a physical broadcast channel (PBCH) of the directional beam discovery signal, the separate channel being transmitted together with the directional beam discovery signal using a same directional beam.

13. The method of claim 1, further comprising:
    identifying a synchronization signal block index of the directional beam discovery signal; and
    determining a timing of a base station based at least in part on the synchronization signal block index.

14. The method of claim 1, wherein:
    the RACH window includes a plurality of RACH opportunities, each RACH opportunity associated with a directional beam of the shared frequency spectrum band.

15. The method of claim 1, wherein:
    the beam discovery window is a discovery reference signal (DRS) measurement timing configuration (DMTC).

16. A method for wireless communication at a base station, comprising:
    determining that communication resources on a shared frequency spectrum band are available for use during a beam discovery window based at least in part on a listen-before-talk (LBT) procedure;
    transmitting a burst of directional beam discovery signals during the beam discovery window based at least in part on the LBT procedure indicating available communication resources;
    identifying a timing of a random access channel (RACH) window that begins after the burst of directional beam discovery signals are transmitted based at least in part on the LBT procedure indicating the available communication resources; and receiving a directional RACH signal during the RACH window.

17. The method of claim 16, further comprising:
signaling the timing of the RACH window using at least one of burst of directional beam discovery signals.

18. The method of claim 16, further comprising:
identifying a first communication resource used for the RACH window; and
transmitting the burst of directional beam discovery signals until a beginning of the first communication resource used for the RACH window.

19. The method of claim 16, further comprising:
identifying a first communication resource used for a RACH window; and
transmitting the burst of directional beam discovery signals until a second communication resource occurring before the first communication resource.

20. The method of claim 19, further comprising:
identifying a last communication resource used for the beam discovery window; and
transmitting the burst of directional beam discovery signals until and including the last communication resource used for the beam discovery window.

21. The method of claim 16, further comprising:
selecting a starting location for the RACH window to allow the burst of directional beam discovery signals to include a transmitted beam in each beam direction associated with the base station.

22. The method of claim 16, further comprising:
determining that the RACH window begins after the beam discovery window.

23. The method of claim 22, further comprising:
identifying a last communication resource of the beam discovery window, wherein the RACH window begins at a first available communication resource after the last communication resource.

24. The method of claim 16, further comprising:
identifying a starting time of the RACH window based at least in part on the LBT procedure indicating the available communication resources.

25. The method of claim 24, further comprising:
transmitting the starting time of the RACH window using a physical broadcast channel (PBCH) of at least one of the burst of directional beam discovery signals.

26. The method of claim 24, further comprising:
transmitting the starting time of the RACH window using a separate channel from the a physical broadcast channel (PBCH) of at least one of the burst of directional beam discovery signals, the separate channel being transmitted together with at least one of the burst of directional beam discovery signals using a same directional beam.

27. The method of claim 16, further comprising:
listening in a unique direction during each RACH opportunity of the RACH window.

28. The method of claim 16, wherein:
each directional beam discovery signal of the burst of directional beam discovery signals is pointed in a different beam direction.

29. An apparatus for wireless communication, comprising:
a processor;
memory in electronic communication with the processor; and
the processor and memory configured to: receive a directional beam discovery signal transmitted during a beam discovery window using a shared frequency spectrum band;
initiate a random access channel (RACH) procedure during a RACH window, wherein a timing of the RACH window is based at least in part on receiving the directional beam discovery signal; and transmit a directional RACH signal during the RACH window.

30. An apparatus for wireless communication, comprising:
a processor;
memory in electronic communication with the processor; and
the processor and memory configured to:
determine that communication resources on a shared frequency spectrum band are available for use during a beam discovery window based at least in part on a listen-before-talk (LBT) procedure;
transmit a burst of directional beam discovery signals during the beam discovery window based at least in part on the LBT procedure indicating available communication resources;
identify a timing of a random access channel (RACH) window that begins after the burst of directional beam discovery signals are transmitted based at least in part on the LBT procedure indicating the available communication resources; and
receive a directional RACH signal during the RACH window.

* * * * *